US010599126B2

(12) United States Patent
Kaneko et al.

(10) Patent No.: US 10,599,126 B2
(45) Date of Patent: Mar. 24, 2020

(54) TOOL-PATH CORRECTING APPARATUS AND TOOL-PATH CORRECTING METHOD

(71) Applicant: Mitsubishi Electric Corporation, Chiyoda-ku (JP)

(72) Inventors: Hiroki Kaneko, Tokyo (JP); Kenji Iriguchi, Tokyo (JP); Takeshi Tsuda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 26 days.

(21) Appl. No.: 15/767,368

(22) PCT Filed: Oct. 25, 2016

(86) PCT No.: PCT/JP2016/081601
§ 371 (c)(1),
(2) Date: Apr. 11, 2018

(87) PCT Pub. No.: WO2017/110236
PCT Pub. Date: Jun. 29, 2017

(65) Prior Publication Data
US 2018/0299859 A1    Oct. 18, 2018

(30) Foreign Application Priority Data

Dec. 24, 2015    (JP) .................................. 2015-252088

(51) Int. Cl.
G05B 19/402    (2006.01)
G05B 19/41    (2006.01)

(52) U.S. Cl.
CPC ........... *G05B 19/402* (2013.01); *G05B 19/41* (2013.01); *G05B 2219/34098* (2013.01);
(Continued)

(58) Field of Classification Search
CPC ........ G05B 19/402; G05B 2219/35167; G05B 2219/37506; G05B 2219/34098; G05B 19/41; Y02P 90/265
See application file for complete search history.

(56) References Cited

U.S. PATENT DOCUMENTS

| 5,247,451 A | 9/1993 | Sawamura et al. |
| 2013/0211578 A1* | 8/2013 | Tanuma ............... G05B 19/402 700/192 |
| 2014/0172153 A1* | 6/2014 | Nishibashi ......... G05B 19/4103 700/192 |

FOREIGN PATENT DOCUMENTS

| JP | 03-259307 A | 11/1991 |
| JP | 08-185211 A | 7/1996 |

(Continued)

OTHER PUBLICATIONS

International Search Report dated Jan. 10, 2017 in PCT/JP2016/081601, filed on Oct. 25, 2016.

*Primary Examiner* — Nathan L Laughlin
(74) *Attorney, Agent, or Firm* — Oblon, McClelland, Maier & Neustadt, L.L.P.

(57) ABSTRACT

A tool-path correcting apparatus includes a cut-point calculating unit that calculates, on the basis of tool path data, tool data, and shape data, cut point information, which is information concerning cut points by a tool on a machining curved surface of a machining shape at the time when the tool is disposed at command points described in the tool path data, a correction-command-point extracting unit that extracts, on the basis of the tool path data and the cut point information, correction command points, which are command points that should be corrected, from command points described in the tool path data, a command-point-correcting-direction determining unit that determines, on the basis of the correction command points, command point correcting (Continued)

directions, which are directions in which the correction command points should be corrected, and a tool-path-data correcting unit that corrects the tool path data.

6 Claims, 25 Drawing Sheets

(52) U.S. Cl.
CPC .............. *G05B 2219/35167* (2013.01); *G05B 2219/37506* (2013.01); *Y02P 90/265* (2015.11)

(56) References Cited

FOREIGN PATENT DOCUMENTS

| | | | |
|---|---|---|---|
| JP | 2006-163665 | A | 6/2006 |
| JP | 2007-257182 | A | 10/2007 |
| JP | 2011-123777 | A | 6/2011 |
| JP | 4900968 | B2 | 3/2012 |

* cited by examiner

TOOL-PATH CORRECTING APPARATUS AND TOOL-PATH CORRECTING METHOD

FIELD

The present invention relates to a tool-path correcting apparatus and a tool-path correcting method for correcting tool path data for machining a machining target object using a numerical control (NC) machine tool.

BACKGROUND

Conventionally, when a free curved surface is machined, after tool path data represented by approximating, with minute line segments, from straight lines, arcs, and curves, a path formed by imaginarily moving a tool in contact with a free curved surface of a machining target is created using computer aided design (CAD) and computer aided manufacturing (CAM) apparatuses, this tool path data is given to an NC machine tool to perform cutting.

The tool path data output from the CAD and CAM apparatuses is mainly described as an NC program. The NC program is input to an NC apparatus included in the NC machine tool.

The NC apparatus reads and interprets the NC program to thereby generate a tool path, which is a path on which a tool moves, and creates interpolation data obtained by interpolating the tool path for each of interpolation periods.

The NC apparatus controls tool axes of tools provided in the NC machine tool with the created interpolation data, moves the tools to desired positions, and performs machining.

A procedure for generally generating tool path data for machining a free curved surface is explained. In the following explanation, the free curved surface is referred to as "machining curved surface".

First, from a shape of a machining curved surface that should be machined in a machining target, an ideal path requested when a tool is moved in contact with the machining curved surface is calculated.

Subsequently, an allowable error is given. Tool path data is generated by approximating a tool path to a minute line segment such that a maximum error between the tool path and the calculated ideal path is equal to or smaller than the given allowable error.

The tool path data is generated on the basis of the procedure explained above.

According to the procedure explained above, the generated tool path data has a maximum error equivalent to the allowable error with respect to the ideal path. Calculation errors of the CAD and CAM apparatuses are present in the error. Therefore, tool path data of a minute line segment unrelated to the direction of the ideal path is sometimes included in the generated tool path data.

As a result, when machining is performed using the tool path data, in some case, movement of the tool unintended in the ideal path occurs and scratches on a machining surface occur.

To accurately move the tool with respect to the machining curved surface, it is necessary to reduce the allowable error given during the generation of the tool path data to be extremely small. However, in that case, problems described below occur.

(1) A time for creating and outputting the tool path data with the CAD and CAM apparatuses increases.

(2) A data amount of the tool path data input to the NC apparatus is enormous.

(3) Machining speed cannot be increased because the data amount of the tool path data is enormous.

(4) Work efficiency decreases because of these problems.

Therefore, it is undesirable to reduce the allowable error given during the tool path data generation to accurately move the tool with respect to the machining curved surface As a solving method in such a case, in Patent Literature 1, tool path data is corrected using the shape of a machining target object. In the following explanation, the shape of the machining target object is simply referred to as "machining shape".

Specifically, Patent Literature 1 discloses a method of dividing the tool path data into a plurality of divided tracks, calculating, as axis control data, any tool positions on the divided tracks and temporal changes of tool moving speed in axial directions on the divided tracks, comparing a tool position in machining work calculated on the basis of the axis control data and a machining shape of the work, determining whether a tool in an intruding state into the machining shape, and, when it is determined that the tool is in the intruding state, correcting the position of the tool in the intruding state using continuous preceding and following tool positions such that the intruding state is avoided.

CITATION LIST

Patent Literature

Patent Literature 1: Japanese Patent No. 4900968

SUMMARY

Technical Problem

However, in the conventional technology of Patent Literature 1, it is determined on the basis of a tool position, which is a relative position of the tool to the work at the time when the tool machines the work, and the machining shape whether the tool is in the intruding state into the machining shape. Therefore, in the conventional technology of Patent Literature 1, even if the tool position is present in a region on the outer side of the machining shape, it cannot be detected that the tool disposed with respect to the tool position actually shaves the work.

In the conventional technology of Patent Literature 1, even when an offset shape offset by an offset amount with respect to the machining shape is used, when radius end mill or a flat end mill, which is a rotary tool other than a ball end mill, is used or when the tool is an asymmetrical shape tool such as a turning tool, it cannot be determined whether the tool is in a shaving state.

Further, in the conventional technology of Patent Literature 1, when the tool position is in the region on the outer side of the machining shape, insufficient shaving on the machining curved surface by the tool cannot be detected.

Therefore, in the case explained above, work for directly correcting the tool position and parameters by an operator is necessary. Therefore, there is a problem in that the work efficiency decreases.

Furthermore, in the conventional technology of Patent Literature 1, when it is determined that the tool is in the intruding state into the machining shape, the position of the tool in the intruding state is corrected by using tool positions preceding and following the tool position such that the tool passes the outer side of the machining shape. When the tool position is corrected, a correcting direction is determined according to machining types such as contour machining and surface machining. Therefore, the operator has to designate the machining type in advance.

In particular, in an NC program in machining in which a plurality of machining types are mixed, the work is complicated. There is a problem in that work efficiency decreases.

The present invention has been devised in view of the above, and an object of the present invention is to obtain a tool-path correcting apparatus that can improve machining quality without deteriorating work efficiency.

Solution to Problem

In order to solve the above-mentioned problems and achieve the object, the present invention provides a tool-path correcting apparatus including: a cut-point calculating unit to, on the basis of tool path data in which movement of a tool for machining a machining target object or the machining target object is described, tool data of the tool, and shape data of a machining shape of the machining target object, calculate cut point information, which is information concerning cut points by the tool on a machining curved surface of the machining shape at a time when the tool is disposed at command points described in the tool path data; a correction-command-point extracting unit to extract, on the basis of the tool path data and the cut point information, correction command points, which are command points that should be corrected, among the command points described in the tool path data; a command-point-correcting-direction determining unit to determine command point correcting directions, which are directions in which the correction command points should be corrected, on the basis of the correction command points; and a tool-path-data correcting unit to correct the tool path data by correcting, on the basis of the tool data, the shape data, the cut point information, the correction command points, and the command point correcting directions, the correction command points according to the command point correcting directions such that the tool comes into contact with the machining curved surface.

Advantageous Effects of Invention

According to the present invention, there is an effect that it is possible to improve machining quality without deteriorating work efficiency.

DESCRIPTION OF EMBODIMENTS

Tool-path correcting apparatuses and tool-path correcting methods according to embodiments of the present invention are explained in detail below with reference to the drawings. Note that the present invention is not limited by the embodiment.

First Embodiment

Figure 1:
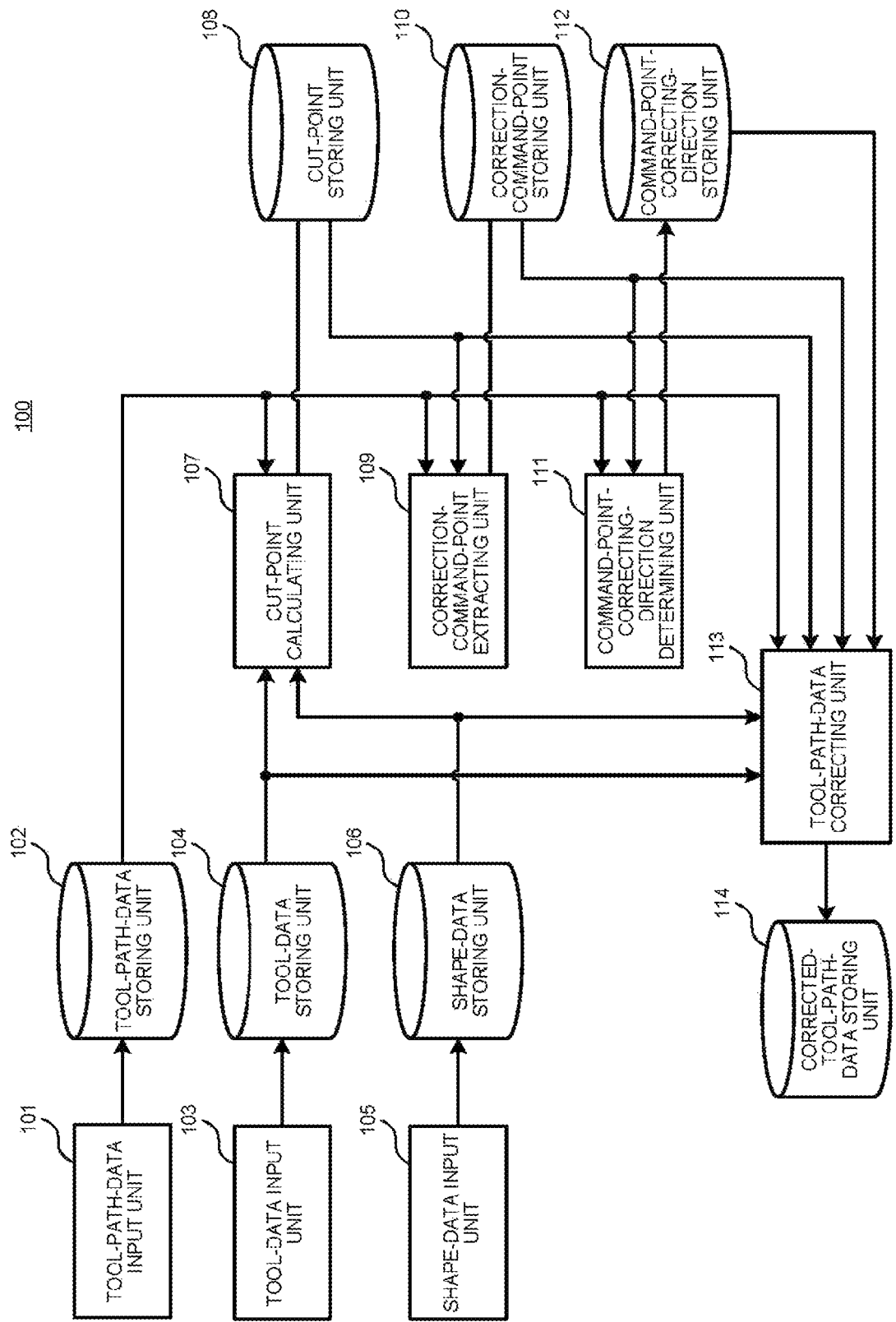
FIG. 1 is a diagram illustrating the configuration of a tool-path correcting apparatus according to a first embodiment.

FIG. 1 is a diagram illustrating the configuration of the tool-path correcting apparatus according to a first embodiment.

A tool-path correcting apparatus 100 includes a tool-path-data input unit 101 to which tool path data, which is a moving path of a tool for machining a not-illustrated machining target object or the machining target object is input from the outside and a tool-path-data storing unit 102 that stores the tool path data input to the tool-path-data input unit 101.

The tool path data input to the tool-path-data input unit 101 is data in which coordinates of command points, which are points to which the tool should move, an interpolating method at the time when the tool moves among a plurality of command points, and tool axis vectors indicating directions of a tool axis in at the command points are described.

The tool path data is, for example, an NC program output by CAD and CAM apparatuses.

Coordinate systems of the command points in the tool path data are converted to be positions of the tool relative to the machining target object at the time when the tool machines the machining target object.

A tool path represents a moving path that the tool passes. The tool path is generated on the basis of the tool path data.

The tool-path correcting apparatus 100 includes a tool-data input unit 103 to which tool data, which is information for defining the tool for machining the machining target object, is input from the outside and a tool-data storing unit 104 that stores the tool data input to the tool-data input unit 103.

The tool data input to the tool-data input unit 103 is formed by information representing a type of the tool and information representing a shape of the tool such as a tool diameter, a tool edge radius, and a tool length.

An example of the tool data is CAD data representing the shape of the tool.

The tool-path correcting apparatus 100 includes a shape-data input unit 105 to which shape data for defining a machining shape of the machining target object including a machining curved surface, which is a curved surface that should be machined by the tool, is input from the outside.

An example of the shape data input to the shape-data input unit 105 is CAD data in which the machining shape of the machining target object is described by a formula and represented by the machining curved surface.

The tool-path correcting apparatus 100 includes a shape-data storing unit 106 that stores the shape data input to the shape-data input unit 105, a cut-point calculating unit 107, and a cut-point storing unit 108 that stores cut point information calculated by the cut-point calculating unit 107.

The cut-point calculating unit 107 reads out the tool path data from the tool-path-data storing unit 102, reads out the tool data from the tool-data storing unit 104, and reads out the shape data from the shape-data storing unit 106.

The cut-point calculating unit 107 calculates information concerning cut points, which are machined points by the tool on the machining curved surface of the machining shape defined by the shape data at the time when the tool defined by the tool data is disposed at the command points described in the tool path data. That is, the cut-point calculating unit 107 calculates cut point information, which is information concerning the cut points.

The cut-point calculating unit 107 causes the cut-point storing unit 108 to store the calculated cut point information.

The tool-path correcting apparatus 100 includes a correction-command-point extracting unit 109 and a correction-command-point storing unit 110 that stores correction command points, which are command points that should be corrected, extracted by the correction-command-point extracting unit 109.

The correction-command-point extracting unit 109 reads out the tool path data from the tool-path-data storing unit 102 and reads out the cut point information from the cut-point storing unit 108.

The correction-command-point extracting unit 109 determines whether command points corresponding to the read-out cut point information should be corrected and extracts, as correction command points, the command points determined to be corrected.

The correction-command-point extracting unit 109 causes the correction-command-point storing unit 110 to store the extracted correction command points.

The tool-path correcting apparatus 100 includes a command-point-correcting-direction determining unit 111 and a command-point-correcting-direction storing unit 112 that stores command point correcting directions determined by the command-point-correcting-direction determining unit 111.

The command-point-correcting-direction determining unit 111 reads out the tool path data from the tool-path-data storing unit 102, reads out the shape data from the shape-data storing unit 106, and reads out the correction command point information from the correction-command-point storing unit 110.

The command-point-correcting-direction determining unit 111 determines command point correcting directions, which are correcting directions of correction command points at the correction command points on the basis of the command points described in the read-out tool path data.

The command-point-correcting-direction determining unit 111 causes the command-point-correcting-direction storing unit 112 to store the determined command point correcting directions.

The tool-path correcting apparatus 100 includes a tool-path-data correcting unit 113 and a corrected-tool-path-data storing unit 114 that stores corrected tool path data, which is tool path data corrected by the tool-path-data correcting unit 113.

The tool-path-data correcting unit 113 reads out the tool path data from the tool-path-data storing unit 102, reads out the tool data from the tool-data storing unit 104, and reads out the shape data from the shape-data storing unit 106.

The tool-path-data correcting unit 113 reads out the cut point information from the cut-point storing unit 108, reads out the correction command point information from the correction-command-point storing unit 110, and reads out the command point correcting direction in each of a plurality of correction command points from the command-point-correcting-direction storing unit 112.

The tool-path-data correcting unit 113 corrects the correction command points on the basis of the tool data, the shape data, the cut point information, and the command point correcting directions.

The tool-path-data correcting unit 113 corrects the tool path data on the basis of the corrected command points and causes the corrected-tool-path-data storing unit 114 to store corrected tool path data, which is the tool path data corrected by the tool-path-data correcting unit 113.

Figure 2:
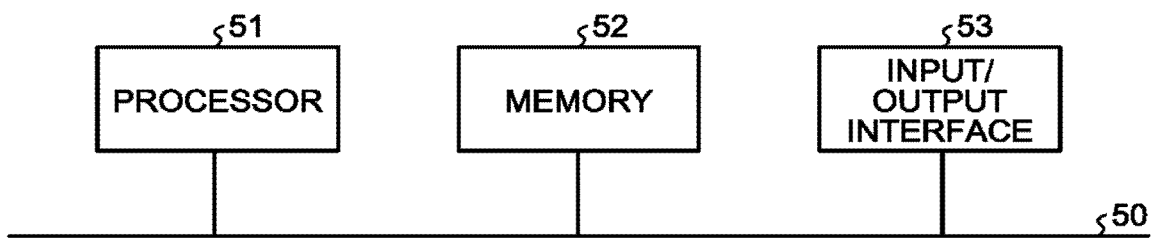
FIG. 2 is a diagram illustrating a hardware configuration example for realizing the tool-path correcting apparatus according to the first embodiment.

FIG. 2 is a diagram illustrating a hardware configuration example for realizing the tool-path correcting apparatus according to the first embodiment. The tool-path correcting apparatus 100 can be realized by a processor 51, a memory 52, and an input/output interface 53.

The processor 51 is a processor such as a central processing unit (CPU) or a micro processing unit (MPU).

The memory 52 is configured by a random access memory (RAM), a read only memory (ROM), a solid state drive (SSD), a hard disk drive (HDD), or a combination of the foregoing.

The input/output interface 53 is used when the tool path data, the tool data, and the shape data are input to the tool-path-data input unit 101, the tool-data input unit 103, and the shape-data input unit 105 from the outside.

The processor 51, the memory 52, and the input/output interface 53 are connected to a bus 50. The processor 51, the memory 52, and the input/output interface 53 mutually perform exchange of various data via the bus 50.

To realize the cut-point calculating unit 107, a program for the cut-point calculating unit 107 is stored in the memory 52. The cut-point calculating unit 107 is realized by the processor 51 executing the program.

To realize the correction-command-point extracting unit 109, a program for correction-command-point extracting unit 109 is stored in the memory 52. The correction-command-point extracting unit 109 is realized by the processor 51 executing the program.

To realize the command-point-correcting-direction determining unit 111, a program for command-point-correcting-direction determining unit 111 is stored in the memory 52. The command-point-correcting-direction determining unit 111 is realized by the processor 51 executing the program.

To realize the tool-path-data correcting unit 113, a program for the tool-path-data correcting unit 113 is stored in the memory 52. The tool-path-data correcting unit 113 is realized by the processor 51 executing the program.

Figure 3:
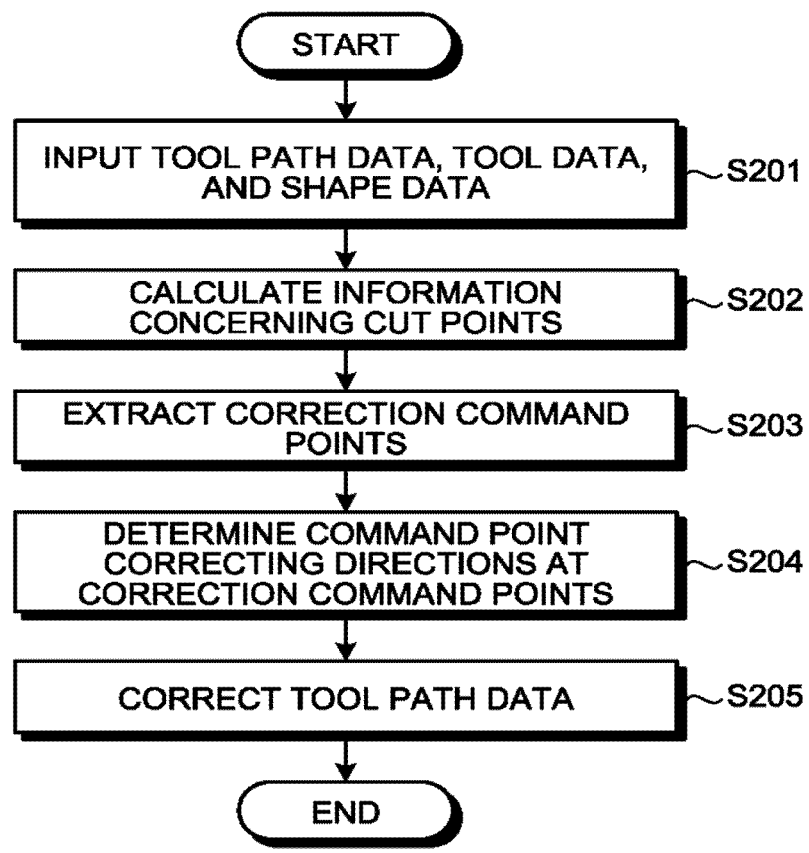
FIG. 3 is a flowchart illustrating a flow of the operation of the tool-path correcting apparatus according to the first embodiment.

The tool-path correcting apparatus 100 configured as explained above operates according to a flowchart illustrated in FIG. 3.

FIG. 3 is a flowchart illustrating a flow of the operation of the tool-path correcting apparatus according to the first embodiment.

At step 201, tool path data is input to the tool-path-data input unit 101 from the outside.

As the input from the outside, a method of input by keyboard operation by an operator or a method of data conversion from an NC program is conceivable. The input tool path data is stored in the tool-path-data storing unit 102.

Tool data is input to the tool-data input unit 103 from the outside. The input tool data is stored in the tool-data storing unit 104.

Further, shape data is input to the shape-data input unit 105 from the outside. The input shape data is stored in the shape-data storing unit 106.

Specific examples of a machining shape, a tool path, and a tool shape are explained with reference to FIG. 4 to FIG. 7.

Figure 4:
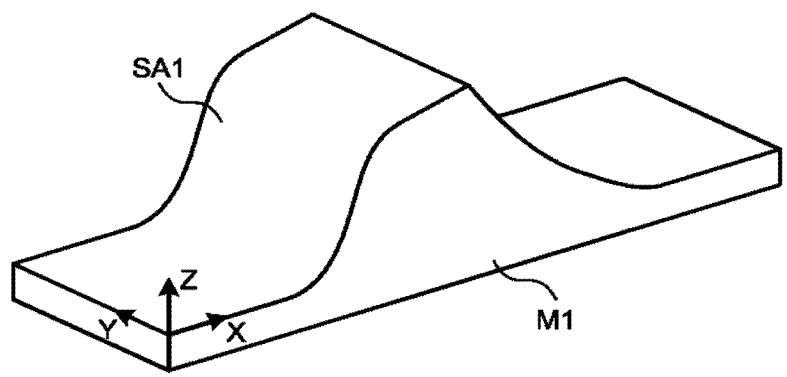
FIG. 4 is a first diagram for explaining a machining shape, a tool path, and a tool shape in the tool-path correcting apparatus according to the first embodiment.

FIG. 4 is a first diagram for explaining a machining shape, a tool path, and a tool shape in the tool-path correcting apparatus according to the first embodiment.

In FIG. 4, a state is illustrated in which a machining shape M1 represented by CAD data serving as shape data for defining a machining shape is viewed from an oblique direction. A machining curved surface group SA1 is present on the upper surface side of the machining shape M1.

Figure 5:
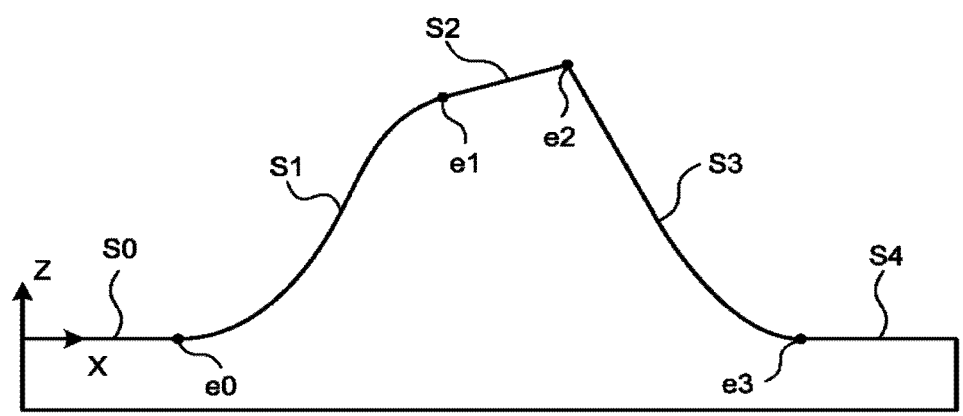
FIG. 5 is a second diagram for explaining the machining shape, the tool path, and the tool shape in the tool-path correcting apparatus according to the first embodiment.

FIG. 5 is a second diagram for explaining the machining shape, the tool path, and the tool shape in the tool-path correcting apparatus according to the first embodiment. In FIG. 5, a state is illustrated in which the machining shape M1 illustrated in FIG. 4 is viewed from a side surface.

The machining curved surface group SA1 illustrated in FIG. 4 is formed by curved surfaces represented by formulas of a plurality of machining curved surfaces S0 to S4 illustrated in FIG. 5.

At this time, the machining curved surfaces S0 and S1 maintain connection continuity of adjacent machining curved surfaces in a connecting section e0 of the adjacent machining curved surfaces.

The machining curved surfaces S1 and S2 maintain connection continuity of adjacent machining curved surfaces in a connecting section e1 of the adjacent machining curved surfaces.

The machining curved surfaces S3 and S4 maintain connection continuity of adjacent machining curved surfaces in a connecting section e3 of the adjacent machining curved surfaces.

The machining curved surfaces S2 and S3 do not maintain connection continuity of adjacent machining curved surfaces in a connecting section e2 of the adjacent machining curved surfaces.

Figure 6:
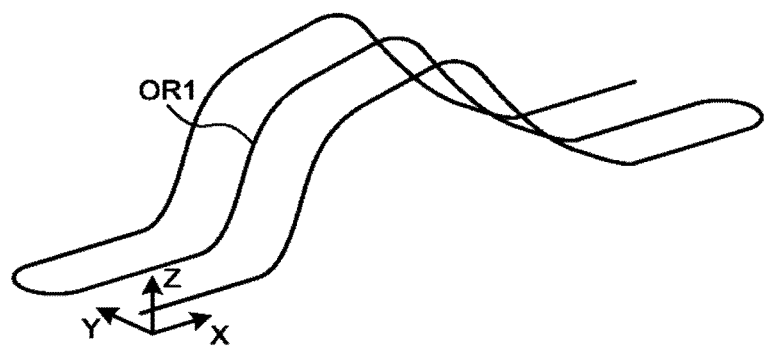
FIG. 6 is a third diagram for explaining the machining shape, the tool path, and the tool shape in the tool-path correcting apparatus according to the first embodiment.

FIG. 6 is a third diagram for explaining the machining shape, the tool path, and the tool shape in the tool-path correcting apparatus according to the first embodiment. In FIG. 6, a state is illustrated in which a tool path OR1 in a part of a plurality of tool paths described in tool path data for machining the machining curved surface group SA1 in the machining shape M1 illustrated in FIG. 4 is viewed from an oblique direction.

Figure 7:
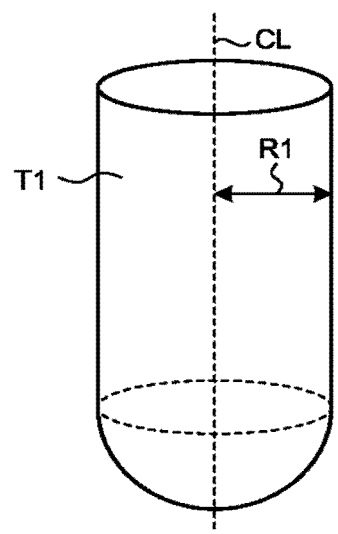
FIG. 7 is a fourth diagram for explaining the machining shape, the tool path, and the tool shape in the tool-path correcting apparatus according to the first embodiment.

FIG. 7 is a fourth diagram for explaining the machining shape, the tool path, and the tool shape in the tool-path correcting apparatus according to the first embodiment. In FIG. 7, an example of a tool shape represented by CAD data serving as tool data for defining a tool T1 moving in the tool path OR1 illustrated in FIG. 6 is illustrated.

The tool T1 in use is a ball end mill. A tool radius R1 equivalent to length from a tool center axis CL to a tool outer circumference is given to the tool T1. Depending on a tool shape, a tilt of a tool outer circumference bus with respect to the tool center axis CL can be given.

After the execution of step 201, the processing proceeds to step 202, which is a cut-point-information calculating step.

At step 202, first, the cut-point calculating unit 107 reads out the tool path data stored in the tool-path-data storing unit 102, reads out the tool data stored in the tool-data storing unit 104, and the shape data stored in the shape-data storing unit 106.

The command points described in the tool path data are positions of the tool relative to the machining target object at the time when the tool machines the machining target object. When the tool is disposed at the command points, ideally, the tool and the machining curved surface of the machining shape are in contact at the command points.

Subsequently, the cut-point calculating unit 107 calculates coordinates of cut points, which are machined points by the tool, on the machining curved surface at the time when the tool is disposed at the command points.

As an example of a method of calculating the cut points at this time, there is a method of calculating a nearest contact point of the tool surface and the machining curved surface at time when the tool is disposed at the command points. The nearest contact point is a point where the distance between the tool T1 and the machining curved surface is the smallest on the machining curved surface.

A specific example of the tool path data is explained below with reference to FIG. 8 to FIG. 13.

Figure 8:
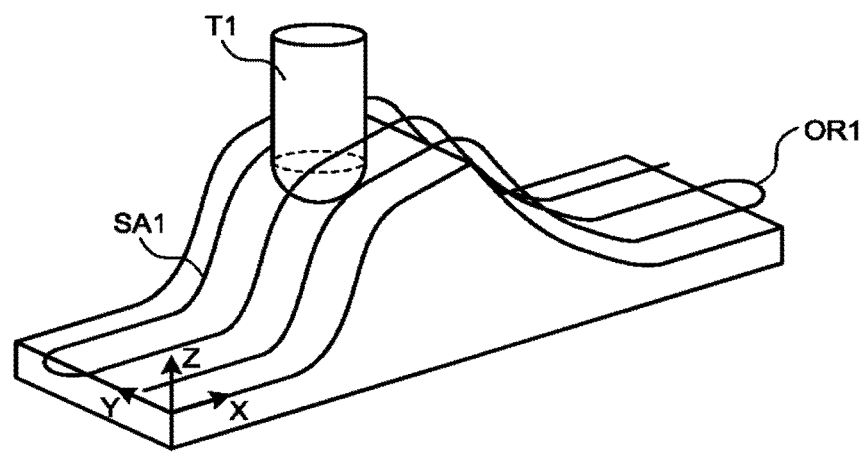
FIG. 8 is a first diagram for explaining a calculating operation for cut point information in the tool-path correcting apparatus according to the first embodiment.

FIG. 8 is a first diagram for explaining a calculating operation for cut point information in the tool-path correcting apparatus according to the first embodiment. In FIG. 8, a state is illustrated in which a state of disposition of the tool T1 on the tool path OR1 for machining the machining curved surface group SA1 is viewed from an oblique direction.

Figure 9:
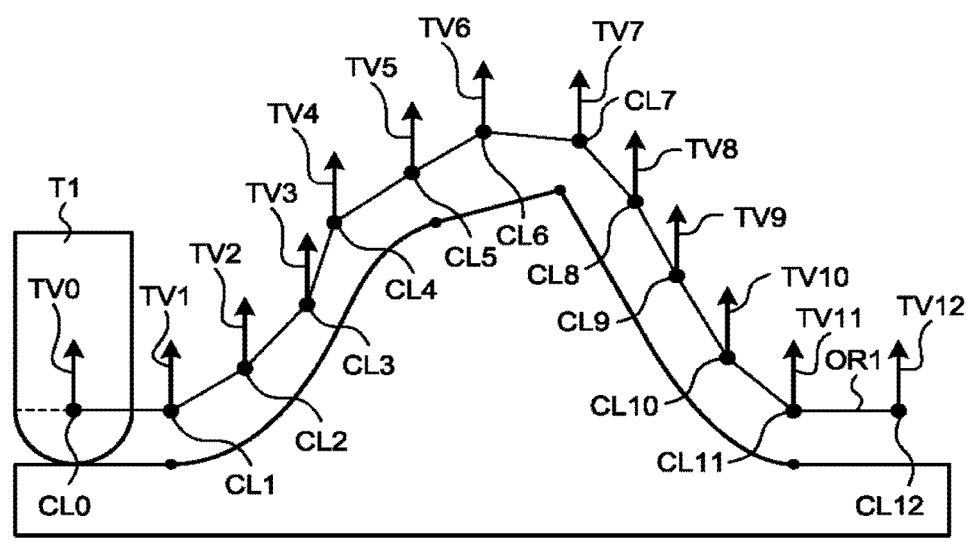
FIG. 9 is a second diagram for explaining the calculating operation for cut point information in the tool-path correcting apparatus according to the first embodiment.

FIG. 9 is a second diagram for explaining the calculating operation for cut point information in the tool-path correcting apparatus according to the first embodiment and is a sectional view in which a perspective view illustrated in FIG. 8 is cut by an XZ plane. Specifically, in FIG. 9, a state is illustrated in which a passing state of the tool T1 on the tool path OR1 illustrated in FIG. 8 is viewed from a side surface side. A machining shape and a tool path on the cut XZ plane are illustrated.

CL0 to CL12 indicate command points described in the tool path data on the tool path OR1. The command points are linearly interpolated.

TV0 to TV12 indicate tool axis vectors, which are directions of the tool axis at the command points CL0 to CL12.

Figure 10:
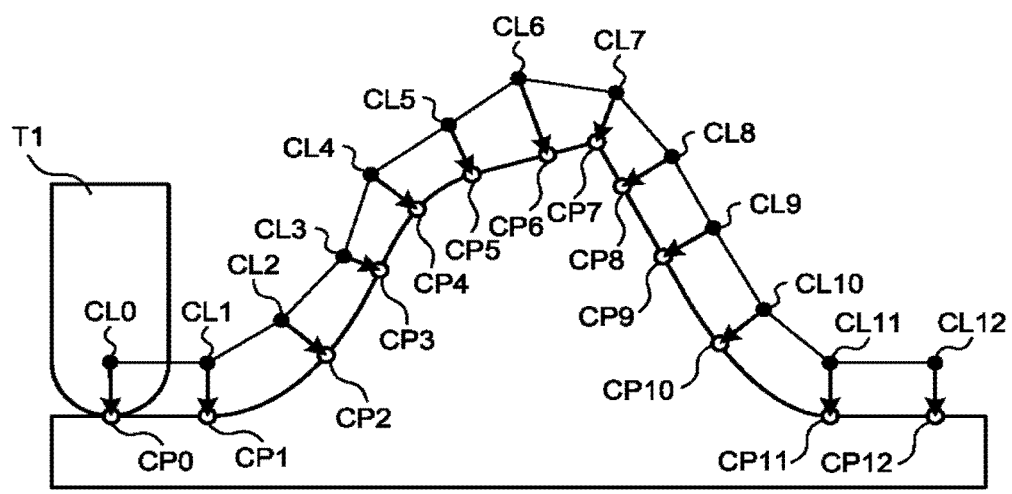
FIG. 10 is a third diagram for explaining the calculating operation for cut point information in the tool-path correcting apparatus according to the first embodiment.

FIG. 10 is a third diagram for explaining the calculating operation for cut point information in the tool-path correcting apparatus according to the first embodiment. In FIG. 10, a calculation example of cut points CP0 to CP12 respectively corresponding to the command points CL0 to CL12 is illustrated.

Figure 11:
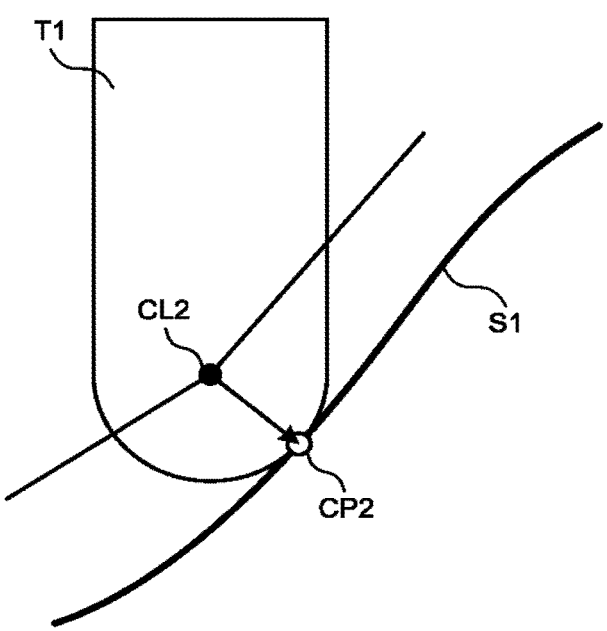
FIG. 11 is a fourth diagram for explaining the calculating operation for cut point information in the tool-path correcting apparatus according to the first embodiment.

FIG. 11 is a fourth diagram for explaining the calculating operation for cut point information in the tool-path correcting apparatus according to the first embodiment. In FIG. 11, a calculation example of the cut point CP2 corresponding to the command point CL2 illustrated in FIG. 10 is illustrated. A state is illustrated in which the tool T1 is in contact with the machining curved surface S1.

At this time, the cut-point calculating unit 107 calculates a contact point of a tool shape of the tool T1 and the machining curved surface S1 as a cut point of the tool T1 and the machining curved surface S1 at the command point CL2.

In this case, the distance between the command point CL2 and the cut point CP2 is equal to the tool radius R1 illustrated in FIG. 7.

Figure 12:
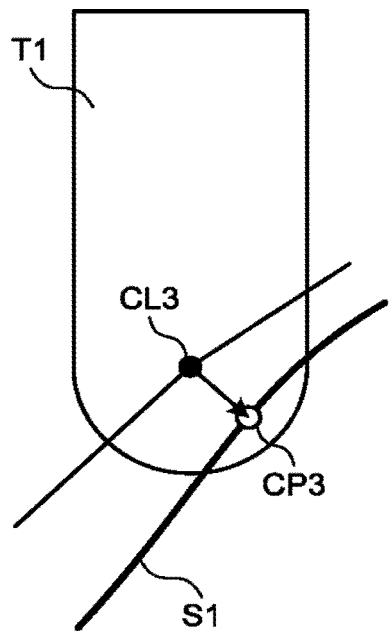
FIG. 12 is a fifth diagram for explaining the calculating operation for cut point information in the tool-path correcting apparatus according to the first embodiment.

FIG. 12 is a fifth diagram for explaining the calculating operation for cut point information in the tool-path correcting apparatus according to the first embodiment. In FIG. 12, a calculation example of the cut point CP3 corresponding to the command point CL3 is illustrated.

The tool T1 is an intruding state into the machining curved surface S1. At this time, the cut-point calculating unit 107 calculates, as a cut point of the tool T1 and the machining curved surface S1 at the command point CL3, a point where the machining curved surface S1 most deeply intrudes with respect to the tool shape of the tool T1 on the machining curved surface S1.

In this case, the distance between the command point CL3 and the cut point CP3 is smaller than the tool radius R1 illustrated in FIG. 7.

Figure 13:
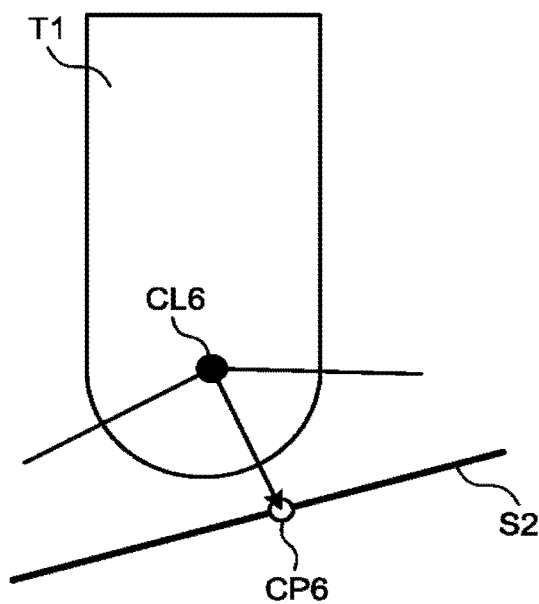
FIG. 13 is a sixth diagram for explaining the calculating operation for cut point information in the tool-path correcting apparatus according to the first embodiment.

FIG. 13 is a sixth diagram for explaining the calculating operation for cut point information in the tool-path correcting apparatus according to the first embodiment. In FIG. 13, a calculation example of the cut point CP6 corresponding to the command point CL6 is illustrated.

The tool T1 is in a separated state from the machining curved surface S2. At this time, the cut-point calculating unit 107 calculates, as a cut point of the tool T1 and the machining curved surface S2 at the command point CL6, a nearest contact point where the distance between the tool shape of the tool T1 and the machining curved surface S2 in the smallest on the machining curved surface S2.

In this case, the distance between the command point CL6 and the cut point CP6 is larger than the tool radius R1 illustrated in FIG. 7.

It is possible to calculate cut points with the method explained above.

On the other hand, a method for calculating a cut point is not limited to the method explained above. For example, by carrying out machining simulation using a material shape of the machining target object, tool path data, and tool data, cut points can be calculated from a post-machining material shape at an instance when the tool passes command points included in the tool path data.

Coordinates of the cut points calculated by the cut-point calculating unit 107 are stored in the cut-point storing unit 108.

In the cut-point storing unit 108, in addition to the coordinates of the cut points, a relative positional relation between the tool and the machining curved surface at the cut points and cut point information configured from curved surface discrimination information for specifying on which curved surface the cut points are present are stored in association with command points.

For example, cut point information corresponding to the command point CL2 illustrated in FIG. 11 is a coordinate of the cut point CP2, which is a nearest contact point, a relative positional relation indicating a state in which the machining curved surface S1 is in contact with the tool T1, and curved surface discrimination information indicating that the cut point CP2 is present on the machining curved surface S1.

Further, for example, cut point information corresponding to the command point CL3 illustrated in FIG. 12 is a coordinate of the cut point CP3, which is a nearest contact point, a relative positional relation indicating a state in which the machining curved surface S1 intrudes with respect to the tool T1, and curved surface discrimination information indicating that the cut point CP3 is present on the machining curved surface S1.

At this time, when the cut points are present on boundaries formed by a plurality of machining curved surfaces, the cut-point storing unit 108 retains information concerning a plurality of machining curved surfaces as curved surface discrimination information.

According to step 202 explained above, by calculating the coordinates of the cut points and calculating the relative positional relation between the tool and the machining curved surface at the cut points, it is possible to discriminate shaving and insufficient shaving on the machining curved surface by the tool.

By calculating the curved surface discrimination information, it is possible to discriminate which machining curved surface the tool machines at the command points. When correction of the tool path data is performed, it is possible to correct the tool path data to machine the same machining curved surface at command points before the correction and after the correction.

After the execution of step 202, the processing proceeds to step 203, which is a correction-command-point extracting step.

At step 203, the correction-command-point extracting unit 109 reads out the tool path data stored in the tool-path-data storing unit 102 and reads out the cut point information stored in the cut-point storing unit 108.

Subsequently, the correction-command extracting unit 109 sequentially refers to relative positional relations between the tool and the machining curved surface at the cut points in the cut point information and extracts cut points where the relative positional relation indicates a state in which the machining curved surface intrudes with respect to the tool or a state in which the machining curved surface is separated from the tool.

The correction-command-point extracting unit 109 extracts command points corresponding to the extracted cut points as correction command points.

Figure 14:
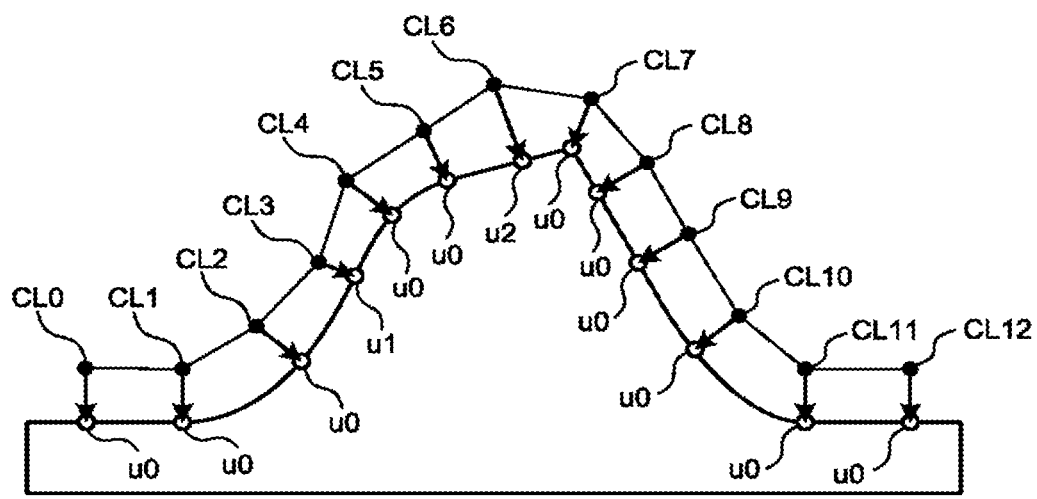
FIG. 14 is a diagram for explaining an operation for extracting correction command points in the tool-path correcting apparatus according to the first embodiment.

FIG. 14 is a diagram for explaining an operation for extracting correction command points in the tool-path correction apparatus according to the first embodiment. In FIG. 14, command points respectively corresponding to the command points CL0 to CL12 are illustrated.

In FIG. 14, u0, u1, and u2 indicate attributes of command points based on curved surface discrimination information of cut point information respectively corresponding to the command points CL0 to CL12.

In FIG. 14, u0 indicates a command point for which correction is unnecessary, u1 indicates a command point that should be corrected where the machining curved surface is in an intruding state with respect to the tool, and u2 indicates a command point that should be corrected where the machining curved surface is in a separated state from the tool.

It is possible to extract correction command points with the method explained above.

The correction command points extracted by the correction-command-point extracting unit 109 are stored in the correction-command-point storing unit 110.

According to step 203 explained above, it is possible to extract shaving and insufficient shaving on the machining curved surface by the tool.

After the execution of step 203, the processing proceeds to step 204, which is a command-point-correcting-direction determining step.

At step 204, the command-point-correcting-direction determining unit 111 reads out the tool path data stored in the tool-path-data storing unit 102, reads out the shape data stored in the shape-data storing unit 106, and reads out the correction command points stored in the correction-command-point storing unit 110.

Subsequently, the command-point-correcting-direction determining unit 111 extracts command points continuously disposed on the same plane among the plurality of command points included in the read-out tool path data.

Practically, in the determination concerning whether the plurality of command points are disposed on the same plane, the command-point-correcting-direction determining unit 111 only has to determine whether a predetermined fixed number or more of command points are present in positions at distances with errors equal to or smaller than a fixed allowable error with respect to a certain plane.

At this time, the predetermined number of command points and the allowable error for determining that the plurality of command points are disposed on the same plane can be given in advance from the outside.

Figure 15:
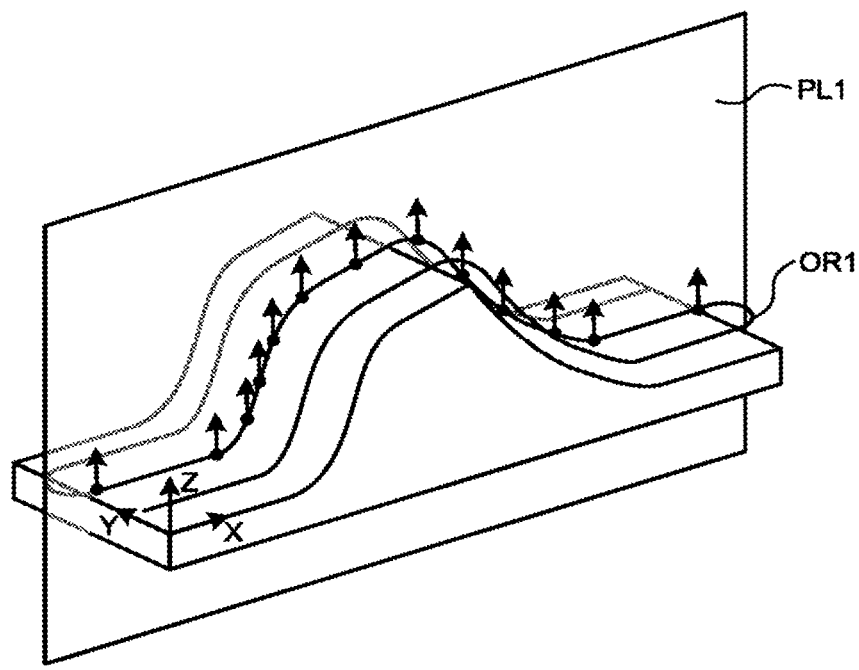
FIG. 15 is a first diagram for explaining an operation for determining command point correcting directions and an operation for correcting tool path data in the tool-path correcting apparatus according to the first embodiment.

FIG. 15 is a first diagram for explaining an operation for determining command point correcting directions and an operation for correcting tool path data in the tool-path correcting apparatus according to the first embodiment. In FIG. 15, a state is illustrated in which a state of disposition on a plane PL1 of a part of command points with respect to the tool path OR1 is viewed from an oblique direction.

The plane PL1 is a plane parallel to a ZX plane and having a normal vector direction in a Y-axis direction.

Figure 16:
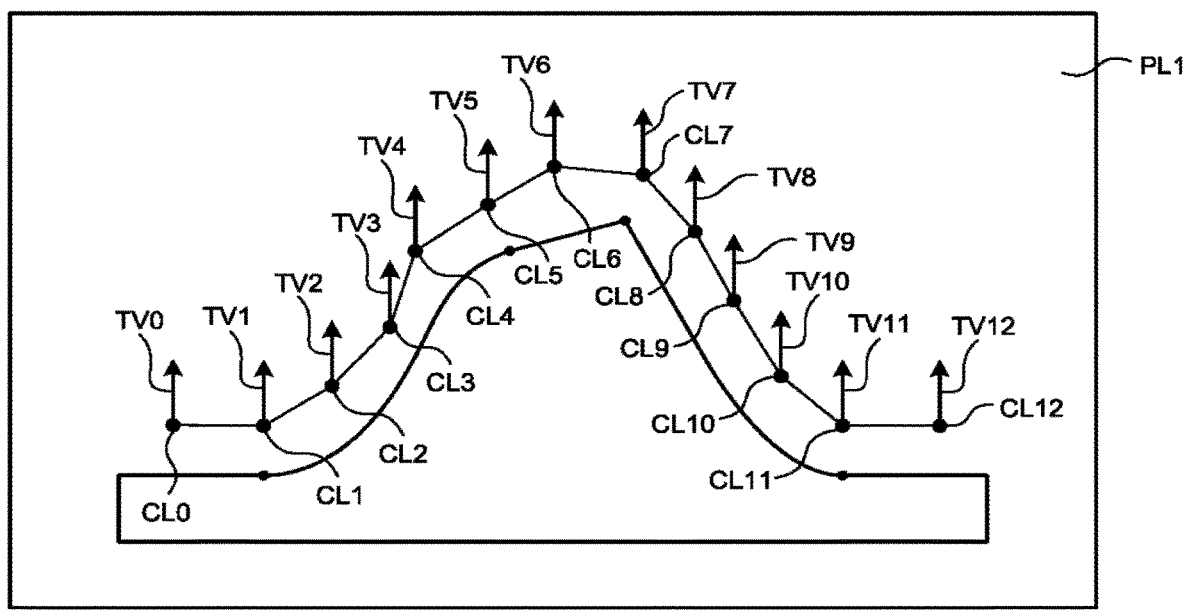
FIG. 16 is a second diagram for explaining the operation for determining command point correcting directions and the operation for correcting tool path data in the tool-path correcting apparatus according to the first embodiment.

FIG. 16 is a second diagram for explaining the operation for determining command point correcting directions and an operation for correcting tool path data in the tool-path correcting apparatus according to the first embodiment. In FIG. 16, a state is illustrated in which a state of disposition of the command points CL0 to CL12 indicated by the tool path data on the plane PL1 and extraction of these command points is viewed from a side.

Subsequently, when a plurality of command points disposed on the same plane are extracted, the command-point-correcting-direction determining unit 111 determines on the basis of tool axis vectors at the extracted command points whether the tool axis vectors are parallel.

In FIG. 16, a state is illustrated in which the tool axis vectors TV0 to TV12 at the command points CL0 to CL12 are parallel to one another. All the directions of the respective tool axis vectors TV0 to TV12 are a Z-axis direction and are parallel to one another.

Subsequently, when it is determined that the tool axis vectors TV0 to TV12 are parallel to one another, the command-point-correcting-direction determining unit 111 determines a relation between the tool axis vectors TV0 to TV12 and a plane on which the command points are disposed.

The relation between the tool axis vectors TV0 to VT12 and the plane can be determined by determining a relation between the tool axis vectors TV0 to TV12 and a normal vector of the plane.

When it is determined that the tool axis vectors TV0 to TV12 and the plane are parallel, that is, the tool axis vectors TV0 to TV12 are perpendicular to the normal vector of the plane, the command-point-correcting-direction determining unit 111 determines that correcting directions of correction command points are directions of the tool axis vectors TV0 to TV12.

In FIG. 16, a state is illustrated in which the plane PL1 on which the command points CL0 to CL12 are disposed and the tool axis vectors TV0 to TV12 at the command points CL0 to CL12 are in a parallel relation.

All the directions of the respective tool axis vectors TV0 to TV12 are the Z-axis direction. The normal vector direction of the plane PL1 is the Y-axis direction.

Consequently, the tool axis vectors TV0 to TV12 and the normal vector are in a perpendicular relation. Therefore, the tool axis vectors TV0 to TV12 and the plane PL1 are parallel. Therefore, it is determined that the command point correcting directions are the directions of the tool axis vectors TV0 to TV12 with respect to the correction command points included in the command points CL0 to CL12.

On the other hand, the tool axis vectors TV0 to TV12 at the command points disposed on the same plane are parallel to one another and the tool axis vectors TV0 to TV12 and the plane are perpendicular, that is, the tool axis vectors TV0 to TV12 are in a parallel relation with the normal vector of the plane, the command-point-correcting-direction determining unit 111 determines that the command point correcting directions of the correction command points are an in-plane direction.

When the plurality of command points disposed on the same plane are not extracted, when tool axis vectors TV0 to TV12 at the command points disposed on the same plane are not parallel to one another, or when the tool axis vectors TV0 to TV12 at the command points disposed on the same plane are parallel to one another and the tool axis vectors TV0 to TV12 and the plane are not in the parallel or perpendicular relation, the command-point-correcting-direction determining unit 111 determines that the command point correcting directions of the correction command points are a curved surface vertical direction.

Details of processing for determining command point correcting directions in these patterns are explained in detail below.

The command-point-correcting-direction determining unit 111 sequentially executes the processing explained above on the other portions on the tool path OR1. Consequently, it is possible to determine command point correcting directions with respect to the correction command points.

The command point correcting directions determined by the command-point-correcting-direction determining unit 111 are stored in the command-point-correcting-direction storing unit 112.

According to step 204 explained above, with a machining pattern, the operator does not need to designate correcting directions with respect to the command points in advance. Work efficiency is improved.

In a tool path including a plurality of machining patterns, correcting directions of command points are determined for each of portions on the basis of tool path data. Therefore, with the machining patterns, the operator does not need to designate correcting directions with respect to the command points in advance. Work efficiency is improved.

After the execution of step 204, the processing proceeds to step 205, which is a tool-path-data correcting step.

At step 205, the tool-path-data correcting unit 113 reads out the tool path data stored in the tool-path-data storing unit 102, reads out the tool data stored in the tool-data storing unit 104, and reads out the shape data stored in the shape-data storing unit 106.

The tool-path-data correcting unit 113 reads out the cut point information stored in the cut-point storing unit 108, reads out the correction command points stored in the correction-command-point storing unit 110, and reads out the command point correcting directions stored in the command-point-correction-direction storing unit 112.

Subsequently, the tool-path-data correcting unit 113 performs correction by moving the correction command points in the command point correcting directions at the correction command points.

At this time, the tool-path-data correcting unit 113 corrects the tool path data such that the tool comes into contact with the machining curved surface having the machining shape when the tool is disposed at the command points after the correction.

When the command point correcting directions at the correction command points are the direction from the tool axis vectors TV0 to TV12, on the basis of a relative positional relation between the tool and the machining curved surface of cut point information corresponding to the correction command points, the command points are respectively moved from the direction of the tool axis vectors TV0 to TV12 when the tool intrudes with respect to the machining curved surface, the command points are respectively moved in the opposite direction of the direction from the tool axis vectors TV0 to TV12 when the tool is separated from the machining curved surface, and the command points are corrected such that the tool comes into contact with the machining curved surface.

Figure 17:
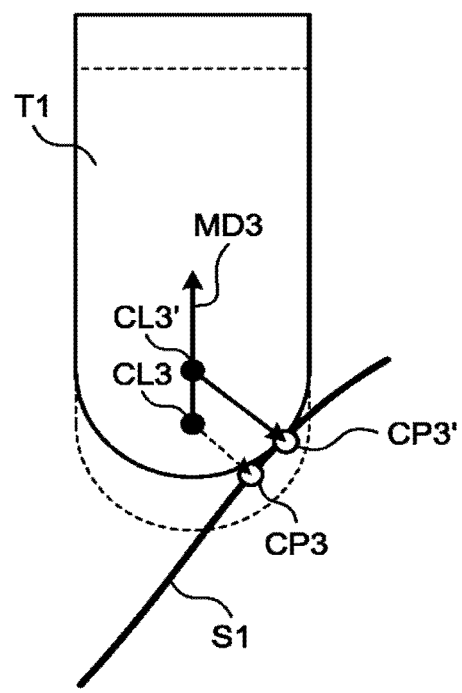
FIG. 17 is a first diagram for explaining a correcting operation for tool path data in the tool-path correcting apparatus according to the first embodiment.

FIG. 17 is a first diagram for explaining a correcting operation for tool path data in the tool-path correcting apparatus according to the first embodiment. In FIG. 17, a state is illustrated in which correction of the command point CL3 is performed when a correcting direction with respect to the command point CL3 is a tool axis vector direction MD3.

The cut point CP3 corresponding to the command point CL3 before correction is a point where the machining curved surface S1 most deeply intrudes into the tool shape of the tool T1 on the machining curved surface S1. The cut point CP3 has a relative positional relation in which the machining curved surface S1 intrudes with respect to the tool T1.

At this time, the tool-path-data correcting unit 113 moves the command point CL3 in the tool axis vector direction MD3 and calculates a position of a command point where the tool shape and the machining curved surface S1 are in contact when the tool T1 is disposed at a command point CL3' after the movement.

As a result, the command point CL3 changes to the command point CL3' after the movement. A cut point CP3' corresponding to the command point CL3' is obtained. When the tool T1 is disposed at the command point CL3' after the movement, the tool shape and the machining curved surface S1 are in contact at the cut point CP3'.

As a method of moving the tool T1 from the command point CL3 in the tool axis vector direction MD3, for example, there is a method of calculating an intersection between a half straight light extended in the opposite direction of the tool axis vector direction MD3 starting from the cut point CP3 and the surface of the tool shape of the tool T1 and moving the command point CL3 in the tool axis vector direction MD3 by a distance between the cut point CP3 and the calculated intersection.

For example, there is a method of moving the command point CL3 in the tool axis vector direction MD3 by a certain fixed distance such that the tool shape of the tool T1 and the machining curved surface S1 are separated, gradually bringing a point generated using a bisection method closer to the opposite direction of the tool axis vector direction MD3, and repeating this until the tool shape comes into contact with the machining curved surface S1.

Figure 18:
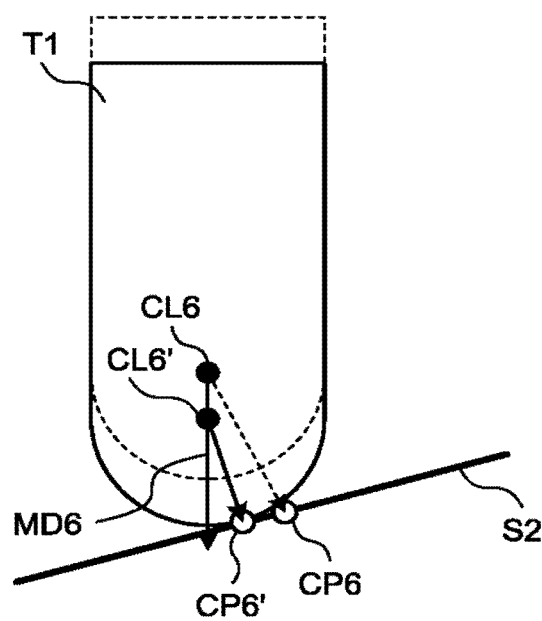
FIG. 18 is a second diagram for explaining the correcting operation for tool path data in the tool-path correcting apparatus according to the first embodiment.

Still another example is illustrated in FIG. 18. FIG. 18 is a second diagram for explaining the correcting operation for tool path data in the tool-path correcting apparatus according to the first embodiment. In FIG. 18, a state is illustrated in which correction is performed when a command point correcting direction is a tool axis vector direction MD6 with respect to the correction command point CL6.

The cut point CP6 corresponding to the command point CL6 before correction is a nearest contact point of the tool shape of the tool T1 and the machining curved surface S2 on the machining curved surface S2. The cut point CP6 has a relative positional relation in which the machining curved surface S2 is separated from the tool T1.

At this time, the tool-path-data correcting unit 113 moves the command point CL6 in the opposite direction of the tool axis vector direction MD6 and calculates a position of a command point where the tool shape and the machining curved surface S2 are in contact when the tool T1 is disposed with respect to a command point after the movement.

As a result, the command point CL6 changes to a command point CL6' after the movement, a cut point CP6' corresponding to the command point CL6' is obtained, and, when the tool T1 is disposed at the command point CL6' after the movement, the tool shape and the machining curved surface S2 are in contact at the cut point CP6'.

Therefore, the command point CL3' and the command point CL6' after the correction are obtained with respect to the correction command point CL3 and the command point CL6.

Subsequently, the tool-path-data correcting unit 113 corrects the tool path data by replacing the command points corrected by the method explained above with the command points before the correction and stores the corrected tool path data in the corrected-tool-path-data storing unit 114.

According to step 205 explained above, by correcting the correction command points on the basis of the command point correcting directions determined on the basis of the tool path data, it is possible to correct the correction command points while maintaining machining patterns at command points around the correction command points.

The processing is ended after the execution of step 205.

In addition to the above explanation of the processing, details of the processing for determining other command point correcting directions at step 204 and details of processing for correcting the correction command points on the basis of the other command point correcting directions at step 205 are explained using other examples.

Figure 19:
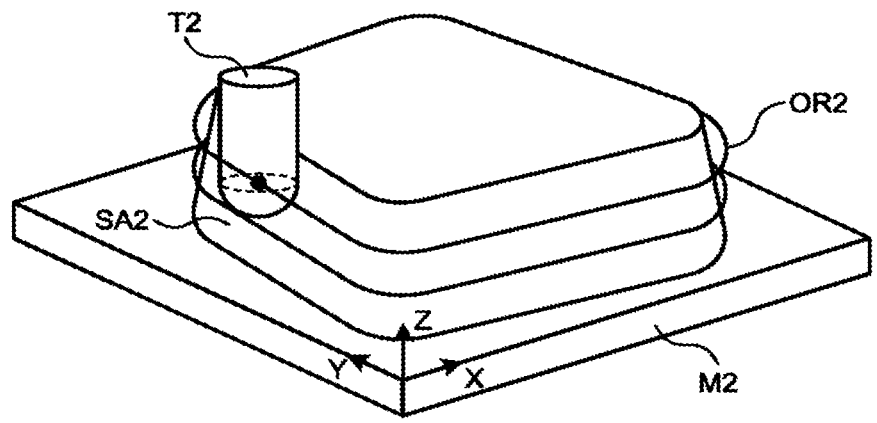
FIG. 19 is a fifth diagram for explaining the machining shape, the tool path, and the tool shape in the tool-path correcting apparatus according to the first embodiment.

Another example at step 204 is illustrated in FIG. 19. FIG. 19 is a fifth diagram for explaining the machining shape, the tool path, and the tool shape in the tool-path correcting apparatus according to the first embodiment.

In FIG. 19, a state is illustrated in which a tool T2 is disposed on a tool path OR2 for machining a machining curved surface group SA2 on a side surface side in a machining shape M2.

Figure 20:
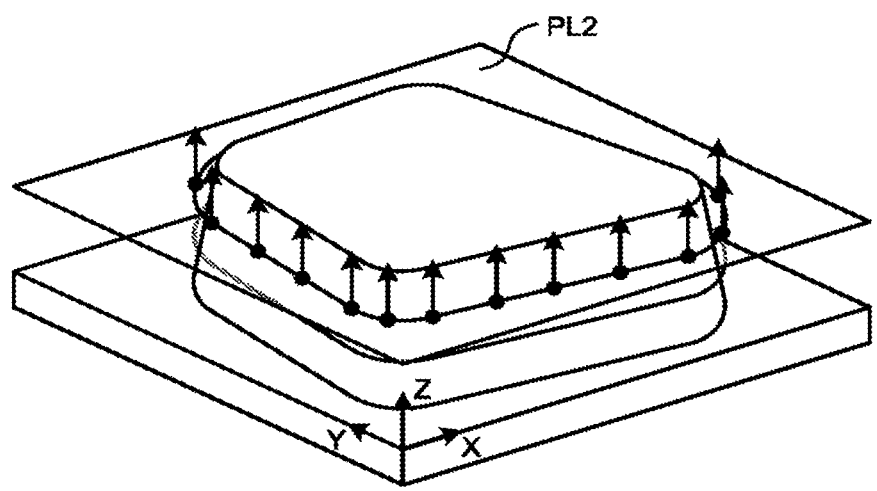
FIG. 20 is a sixth diagram for explaining the machining shape, the tool path, and the tool shape in the tool-path correcting apparatus according to the first embodiment.

FIG. 20 is a sixth diagram for explaining the machining shape, the tool path, and the tool shape in the tool-path correcting apparatus according to the first embodiment. In FIG. 20, a state is illustrated in which a state of disposition of a part of command points on a plane PL2 with respect to the tool path OR2 illustrated in FIG. 19 is viewed from an oblique direction.

The plane PL2 is a plane parallel to an XY plane and having a normal vector direction in the Z-axis direction.

Figure 21:
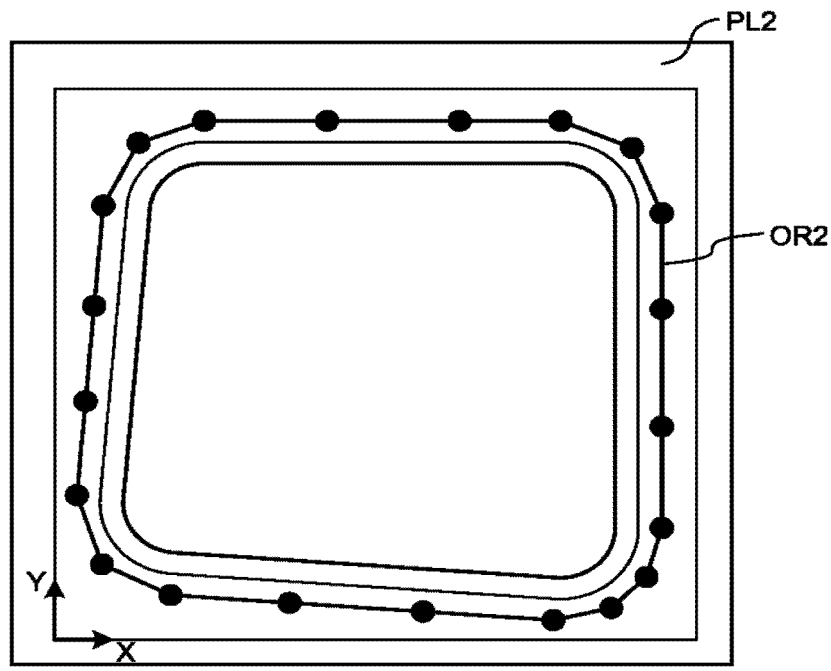
FIG. 21 is a seventh diagram for explaining the machining shape, the tool path, and the tool shape in the tool-path correcting apparatus according to the first embodiment.

FIG. 21 is a seventh diagram for explaining the machining shape, the tool path, and the tool shape in the tool-path correcting apparatus according to the first embodiment. In FIG. 21, a state is illustrated in which a state of disposition of a part of command points on the plane PL2 with respect to the tool path OR2 and extraction of the command points through the disposition on the same plane is viewed from the upper side.

At this time, all tool axis vectors at the extracted command points are the Z direction and parallel to one another. Therefore, the tool axis vectors and the plane PL2 are perpendicular, that is, the tool axis vectors are in a parallel relation with a normal vector of the plane. Therefore, it is determined that command point correcting directions of the correction command points are the in-plane direction.

Figure 22:
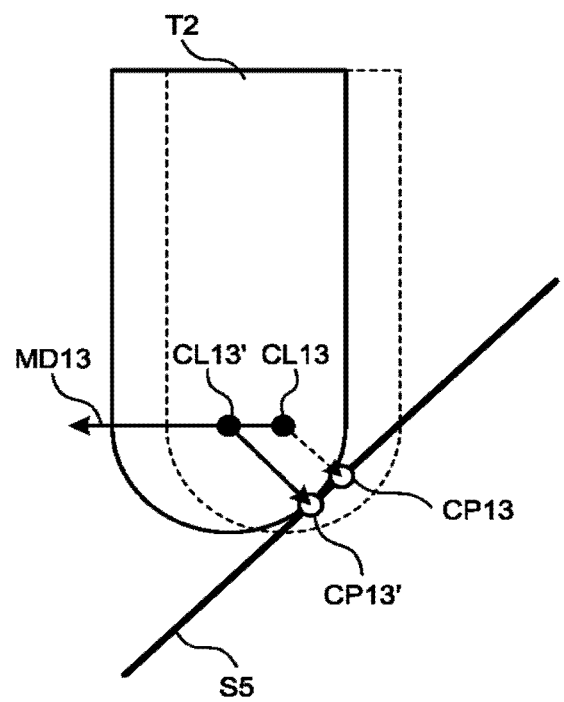
FIG. 22 is an eighth diagram for explaining the machining shape, the tool path, and the tool shape in the tool-path correcting apparatus according to the first embodiment.

FIG. 22 is an eighth diagram for explaining the machining shape, the tool path, and the tool shape in the tool-path correcting apparatus according to the first embodiment. In FIG. 22, a state is illustrated in which a state of correction performed on a correction command point CL13 when a command point correcting direction MD13 at the correction command point is the in-plane direction is viewed from a side surface side.

A cut point CP13 corresponding to the command point CL13 before the correction is a point where a machining curved surface S5 most deeply intrudes with respect to a tool shape of the tool T2 on the machining curved surface S5. The cut point CP13 has a relative positional relation in which the machining curved surface S5 intrudes with respect to the tool T2.

At this time, the tool-path-data correcting unit 113 moves the command point CL13 in the in-plane direction and calculates a position of a command point where the tool shape and the machining curved surface S5 are in contact when the tool T2 is disposed with respect to a command point after the movement.

As a result, the command point CL13 changes to a command point CL13' after the movement, a cut point CP13' corresponding to the command point CL13' is obtained, and the tool shape and the machining curved surface S5 are in contact at the cut point CP13' when the tool T2 is disposed at the command point CL13' after the movement.

Practically, it is possible to determine, for example, with a method of moving the correction command points in directions in which a movement amount is minimum when command points are moved on a plane, in which directions in the plane the correction command points are moved when the command point correcting directions are the in-plane direction.

Figure 23:
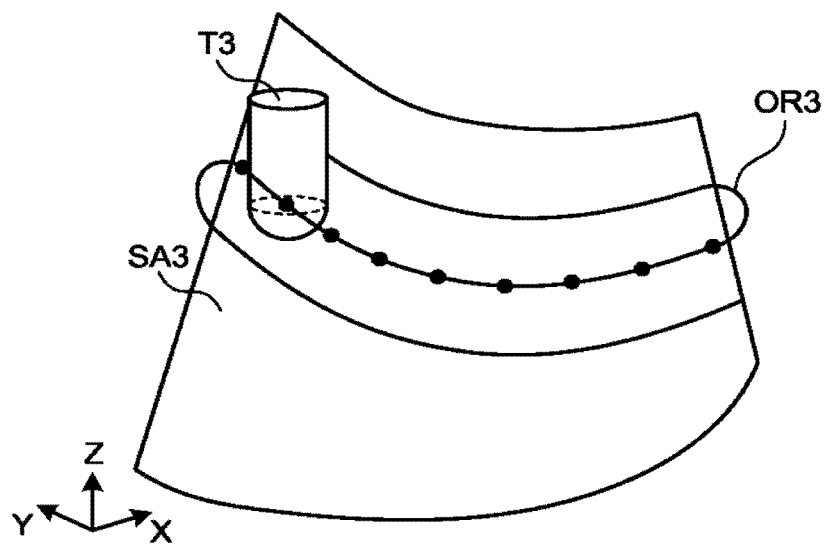
FIG. 23 is a ninth diagram for explaining the machining shape, the tool path, and the tool shape in the tool-path correcting apparatus according to the first embodiment.

As another method, it is possible to determine the directions by a method of moving, using the bisection method explained above, in the direction or the opposite direction of a vector projected on the plane, direction vectors from the correction command points to cut points corresponding to the correction command points or curved surface normal vectors of machining curved surfaces at the cut points corresponding to the correction command points Still another example at step 204 is illustrated in FIG. 23. FIG. 23 is a ninth diagram for explaining the machining shape, the tool path, and the tool shape in the tool-path correcting apparatus according to the first embodiment. In FIG. 23, a state is illustrated in which a tool T3 is disposed with respect to a part of a tool path OR3 for machining a machining curved surface group SA3.

In the example illustrated in FIG. 23, a plurality of command points disposed on the same plane are not extracted with respect to the tool path OR3. In this case, the command-point-correcting-direction determining unit 111 determines that command point correcting directions of correction command points are the curved surface vertical direction.

Figure 24:
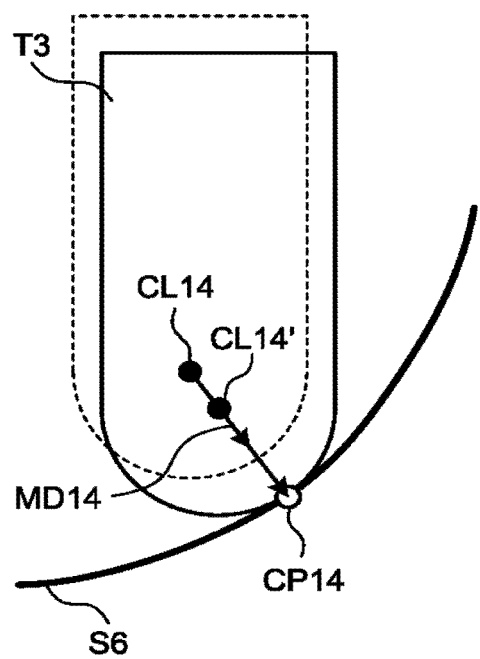
FIG. 24 is a tenth diagram for explaining the machining shape, the tool path, and the tool shape in the tool-path correcting apparatus according to the first embodiment.

In this example, further, at step 205, correction of a correction command point CL14 illustrated in FIG. 24 is performed. FIG. 24 is a tenth diagram for explaining the machining shape, the tool path, and the tool shape in the tool-path correcting apparatus according to the first embodiment.

In FIG. 24, a state is illustrated in which a state of correction performed on the correction command point CL14 when the command point correcting direction at the correction command point CL14 is the curved surface vertical direction is viewed from a side surface direction.

A cut point CP14 corresponding to the correction command point CL14 is a nearest contact point of a machining curved surface S6 with a tool shape of the tool T3. The cut point CP14 has a relative positional relation in which the tool T3 is separated from the machining curved surface S6.

At this time, the tool-path-data correcting unit 113 moves the correction command point CL14 in a normal vector direction MD14 of a machining curved surface at the cut point CP14 and calculates a position of a command point where the tool shape and the machining curved surface S6 are in contact when the tool T3 is disposed with respect to a command point after the movement.

As a result, the correction command point CL14 changes to a command point CL14' after the correction, a cut point CP14' corresponding to the command point CL14' is obtained, and, when the tool T3 is disposed at the command point CL14' after the movement, the tool shape and the machining curved surface S6 are in contact at the cut point CP14'.

The operation of the tool-path correcting apparatus according to the first embodiment is as explained above.

With the tool-path correcting apparatus according to the first embodiment, cut point information, which is information concerning cut points by a tool on a machining curved surface, is calculated. Correction command point information, which is command points that should be corrected on the basis of a relative positional relation with a machining tool shape of the tool, is extracted.

Therefore, it is possible to detect shaving and insufficient shaving on a machining shape at the command points by the tool.

By using the cut point information, when a radius end mill or a flat end mill, which is a rotary tool other than the ball end mill, is used or when the tool is an asymmetrical shape tool such as a turning tool, it is possible to detect the shaving and the insufficient shaving.

Command point correcting directions, which are directions in which the correction command points are corrected, are determined on the basis of tool path data. Therefore, the operator does not need to designate correcting directions with respect to the command points in advance. Work efficiency is improved.

Second Embodiment

A configuration example of the tool-path correcting apparatus 100 according to a second embodiment of the present invention is explained below.

The configuration of the tool-path correcting apparatus 100 according to the second embodiment is the same as the configuration in the first embodiment. Therefore, explanation of the configuration is omitted. A flowchart illustrating the operation of the tool-path correcting apparatus 100 according to the second embodiment is the same as the flowchart in the first embodiment.

The operation of the tool-path correcting apparatus 100 according to the second embodiment is explained below with reference to FIG. 3.

Explanation of an operation at step 201 is omitted because the operation is the same as the operation in the first embodiment.

Data input to the tool-path correcting apparatus 100 according to the second embodiment is explained with reference to FIG. 25 to FIG. 28.

Figure 25:
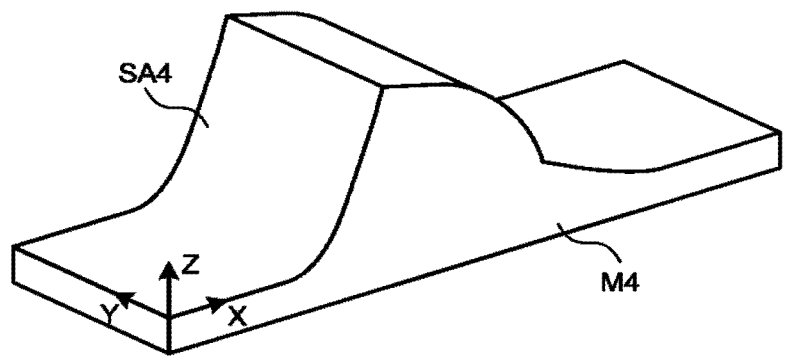
FIG. 25 is a first diagram for explaining a machining shape, a tool path, and a tool shape in the tool-path correcting apparatus according to a second embodiment.

FIG. 25 is a first diagram for explaining a machining shape, a tool path, and a tool shape in the tool-path correcting apparatus according to the second embodiment.

In FIG. 25, a state is illustrated in which a post-machining shape M4 of a machining target object by shape data input to the tool-path-data input unit 101 of the tool-path correcting apparatus 100 according to the second embodiment is viewed from an oblique direction.

An example of the shape data is CAD data in which a machining shape of the machining target object is described by a formula and represented by a machining curved surface.

Figure 26:
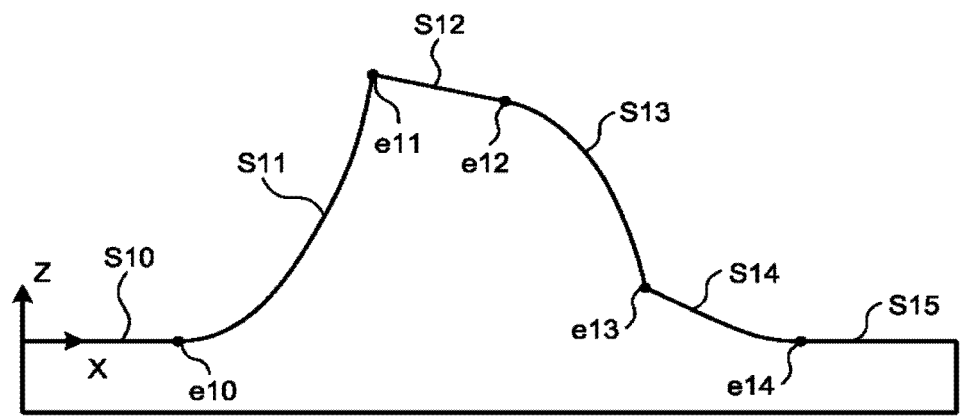
FIG. 26 is a second diagram for explaining the machining shape, the tool path, and the tool shape in the tool-path correcting apparatus according to the second embodiment.

FIG. 26 is a second diagram for explaining the machining shape, the tool path, and the tool shape in the tool-path correcting apparatus according to the second embodiment. In FIG. 26, a state is illustrated in which the post-machining shape M4 illustrated in FIG. 25 is viewed from a side surface.

A machining curved surface group SA4 illustrated in FIG. 25 is formed by curved surfaces represented by formulas of a plurality of machining curved surfaces S10 to S15 illustrated in FIG. 26.

At this time, the machining curved surfaces S10 and S11 maintain connection continuity of adjacent curved surfaces in a connecting section e10 of the adjacent machining curved surfaces.

The machining curved surfaces S12 and S13 maintain connection continuity of curved surfaces in a connecting section e12 of adjacent machining curved surfaces.

The machining curved surfaces S14 and S15 maintain connection continuity of curved surfaces in a connecting section e14 of adjacent machining curved surfaces.

The machining curved surfaces S11 and S12 do not maintain connection continuity of curved surfaces in a connecting section e11 of adjacent machining curved surfaces.

The machining curved surfaces S13 and S14 do not maintain connection continuity of curved surfaces in a connecting section e13 of adjacent machining curved surfaces.

Figure 27:
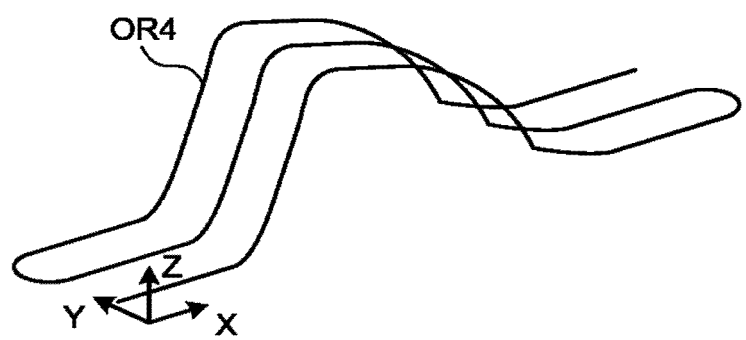
FIG. 27 is a third diagram for explaining the machining shape, the tool path, and the tool shape in the tool-path correcting apparatus according to the second embodiment.

FIG. 27 is a third diagram for explaining the machining shape, the tool path, and the tool shape in the tool-path correcting apparatus according to the second embodiment. In FIG. 27, a state is illustrated in which a tool path OR4 described in tool path data for machining the machining curved surface group SA4 in the post-machining shape M4 illustrated in FIG. 25 is viewed from an oblique direction.

Figure 28:
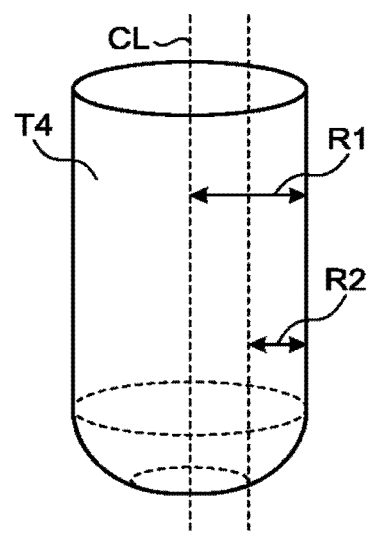
FIG. 28 is a fourth diagram for explaining the machining shape, the tool path, and the tool shape in the tool-path correcting apparatus according to the second embodiment.

FIG. 28 is a fourth diagram for explaining the machining shape, the tool path, and the tool shape in the tool-path correcting apparatus according to the second embodiment. In FIG. 28, an example of a tool shape represented by CAD data serving as tool data for defining a tool T4 moving on the tool path OR4 illustrated in FIG. 27 is illustrated.

The tool T4 in use is a radius end mill. The tool radius R1 equivalent to the length from a tool center axis to a tool outer circumference and a radius R2 of roundness of a corner portion in a tool edge are given to the tool T4.

In the case of a tool shape having a taper, a tilt of a tool outer circumference bus with respect to the tool center axis can be given in addition to the tool radius R1 and the radius R2.

After the execution of step 201, the processing proceeds to step 202.

An operation at step 202 in the second embodiment is the same as the operation in the first embodiment. Therefore, explanation of processing at step 202 is omitted.

Figure 29:
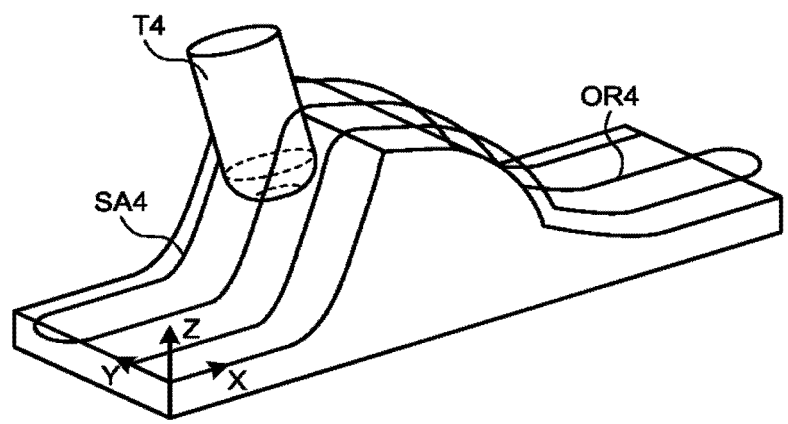
FIG. 29 is a first diagram for explaining a calculating operation for cut point information in the tool-path correcting apparatus according to the second embodiment.

FIG. 29 is a first diagram for explaining a calculating operation for cut point information in the tool-path correcting apparatus according to the second embodiment. In FIG. 29, a state is illustrated in which a state of disposition of the tool T4 on the tool path OR4 for machining the machining curved surface group SA4 is viewed from an oblique direction.

Figure 30:
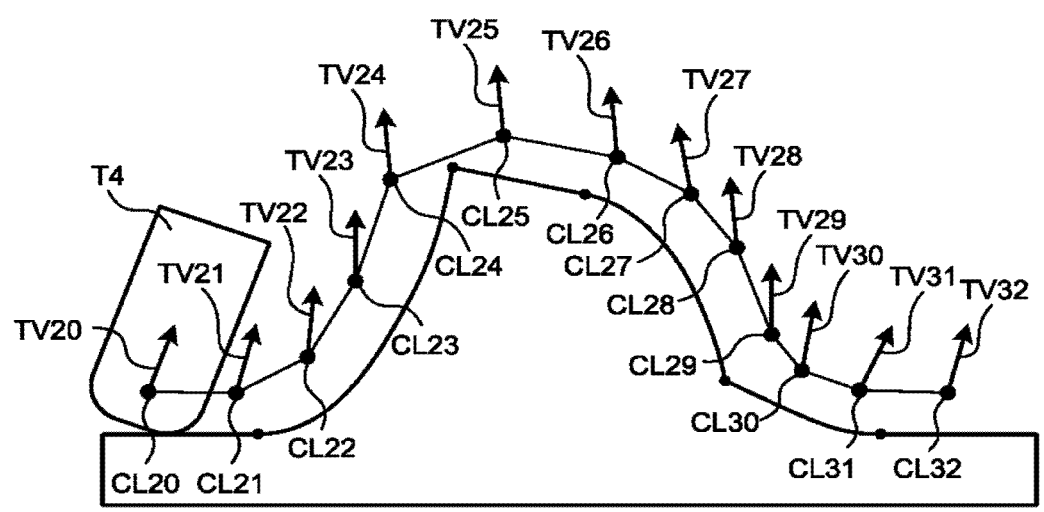
FIG. 30 is a second diagram for explaining the calculating operation for cut point information in the tool-path correcting apparatus according to the second embodiment.

FIG. 30 is a second diagram for explaining the calculating operation for cut point information in the tool-path correcting apparatus according to the second embodiment. In FIG. 30, a state is illustrated in which a state of passage of the tool T4 on the tool path OR4 for machining the machining curved surface group SA4 illustrated in FIG. 29 is viewed from a side surface side.

FIG. 30 is a sectional view in which a perspective view illustrated in FIG. 29 is cut by an XZ plane. A machining shape and a tool path on the cut XZ plane are illustrated.

At this time, CL20 to CL32 indicate command points indicated by tool path data. The command points are linearly interpolated.

TV20 to TV32 indicate tool axis vectors at the command points CL20 to CL32.

Figure 31:
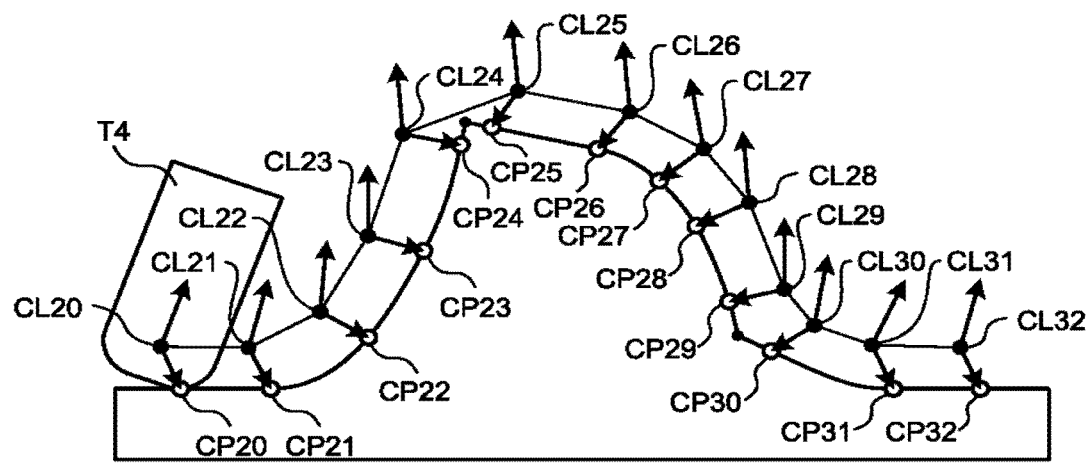
FIG. 31 is a third diagram for explaining the calculating operation for cut point information in the tool-path correcting apparatus according to the second embodiment.

FIG. 31 is a third diagram for explaining the calculating operation for cut point information in the tool-path correcting apparatus according to the second embodiment. In FIG. 31, a calculation example of cut points CP20 to CP32 respectively corresponding to the command points CL20 to CL32 is illustrated.

After the execution of step 202, the processing proceeds to step 203.

At step 203, the correction-command-point extracting unit 109 reads out the tool path data stored in the tool-path-data storing unit 102 and reads out the cut point information stored in the cut-point storing unit 108.

Subsequently, the correction-command-point extracting unit 109 extracts a combination of command points, two cut points respectively corresponding to continuous two command points of which are discontinuous along a machining curved surface. Specifically, when curved surface discrimination information at continuous two cut points is compared on the basis of curved surface discrimination information for specifying on which curved surface positions of cut points of cut point information are present, continuous two cut points on different machining curved surfaces are extracted.

At this time, when curved surface discrimination information of continuous two cut points present on a boundary on which cut points are formed from a plurality of machining curved surfaces shares at least one or more machining curved surfaces, the cut points are not regarded as being present on different machining curved surfaces.

The correction-command-point extracting unit 109 extracts, as a combination of correction command points, continuous two first and second command points corresponding to the extracted continuous two cut points.

Figure 32:
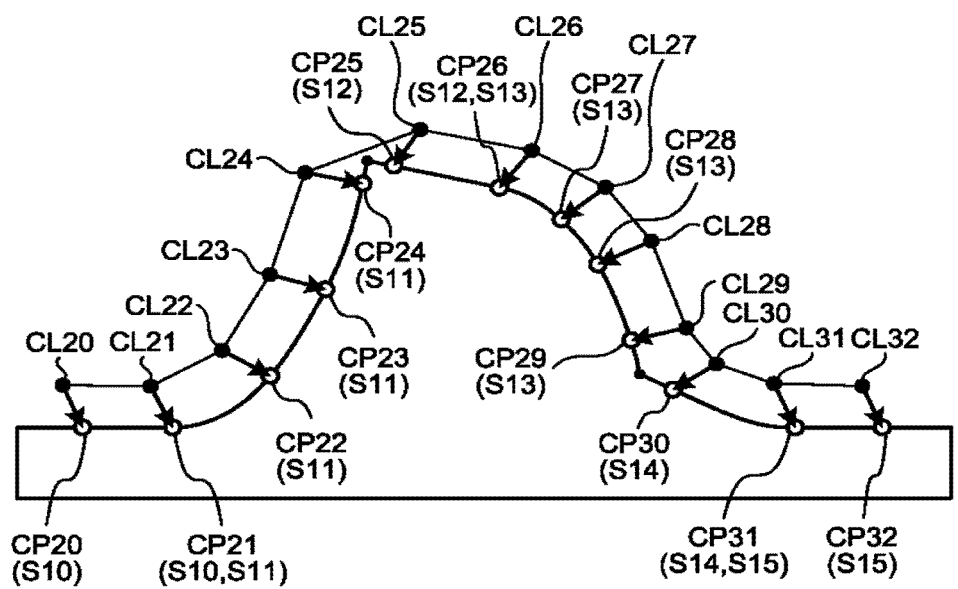
FIG. 32 is a first diagram for explaining an operation for correcting tool path data in the tool-path correcting apparatus according to the second embodiment.

FIG. 32 is a first diagram for explaining an operation for correcting tool path data in the tool-path correcting apparatus according to the second embodiment.

In FIG. 32, a situation is illustrated in which curved surface discrimination information at the cut points CP20 to CP32 respectively corresponding to the command points CL20 to CL32 is illustrated.

The cut points CP20 to CP32 indicates on which machining curved surfaces the cut points CP20 to CP32 are present. For example, the cut point CP20 indicates that the cut point CP20 is present on the machining curved surface S10. The cut point CP21 indicates that the cut point CP21 is present on the boundary between the machining curved surface S10 and the machining curved surface S11.

Figure 33:
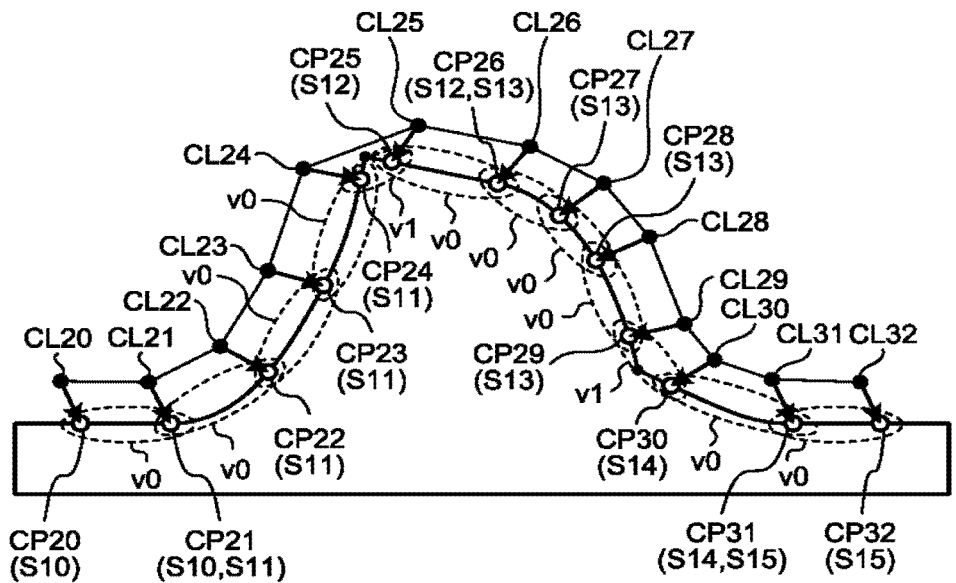
FIG. 33 is a second diagram for explaining the operation for correcting tool path data in the tool-path correcting apparatus according to the second embodiment.

FIG. 33 is a second diagram for explaining the operation for correcting tool path data in the tool-path correcting apparatus according to the second embodiment. In FIG. 33, a state is illustrated in which a combination of correction command points among the command points CL20 to CL32 is extracted.

When curved surface discrimination information included in cut point information of continuous two cut points in the cut points CP20 to CP32 is referred to, a combination of cut points, correction of command points corresponding to which is unnecessary, is indicated as an attribute v0 and a combination of cut points, correction of command points corresponding to which is necessary, is indicated as an attribute v1.

In a combination of the cut points CP21 and CP22, the cut points CP21 is present on the boundary between the machining curved surface S10 and the machining curved surface S11 and the cut point CP22 is present on the machining curved surface S11.

At this time, the cut points CP21 and CP 22 share the machining curved surface S11. Therefore, correction is unnecessary for the command point CL21 and the command point CL22 respectively corresponding to the cut point CP21 and the cut point CP22.

In a combination of the cut points CP 24 and CP25, the cut point CP24 is present on the machining curved surface S11 and the cut point CP25 is present on the machining curved surface S12.

At this time, a machining curved surface shared by the cut points CP24 and CP25 is absent. Therefore, correction is necessary for the command point CL24 and the command point CL25 respectively corresponding to the cut points CP24 and CP25. The command point CL24 and the command point CL25 are extracted as a combination of correction command points.

As in the method explained above, the correction-command-point extracting unit 109 extracts a combination of correction command points, two cut points respectively corresponding to continuous two command points of which are discontinuous along a machining curved surface.

As another method for extracting a combination of command points, two cut points respectively corresponding to continuous two command points of which are discontinuous along a machining curved surface, it is possible to extract the combination of command points by extracting a case in which a curve interpolating the two cut points along the machining curved surface crosses the boundary between the machining curved surfaces.

The combination of correction command points extracted by the correction-command-point extracting unit 109 is stored in the correction-command-point storing unit 110.

According to step 203 explained above, it is possible to extract shaving and insufficient shaving between continuous two command points.

After the execution of step 203, the processing proceeds to step 204.

An operation according to the second embodiment at step 204 is the same as the operation according to the first embodiment. Therefore, explanation of the processing at step 204 is omitted.

After the execution of step 204, the processing proceeds to step 205.

An operation according to the second embodiment at step 205 is different from the operation according to the first embodiment. Therefore, processing at step 205 is explained.

At step 205, the tool-path-data correcting unit 113 reads out the tool path data stored in the tool-path-data storing unit 102, reads out the tool data stored in the tool-data storing unit 104, reads out the shape data stored in the shape-data storing unit 106, reads out the cut point information stored in the cut-point storing unit 108, reads out the correction command points stored in the correction-command-point storing unit 110, and reads out the command point correcting directions stored in the command-point-correcting-direction storing unit 112.

Subsequently, the tool-path-data correcting unit 113 inserts a command point anew between two command points in a combination of the read-out correction command points.

At this time, the tool-path-data correcting unit 113 corrects, on the basis of curved surface discrimination information of cut points corresponding to the correction command points, the command point inserted anew to have cut points on boundaries among a plurality of machining curved surfaces by the respective kinds of curved surface discrimination information or simultaneously have cut points on the plurality of machining curved surfaces by the respective kinds of curved surface discrimination information.

When the command point correcting direction is a curved surface normal vector direction, while causing the tool to pass along a tool path between two correction command points, the tool-path-data correcting unit 113 moves the tool in the direction of a vector obtained by interpolating two curved surface normal vectors at the cut points corresponding to the correction command points or in a direction opposite to the direction and adds a command point anew to correct the tool path data to simultaneously have cut points with respect to two machining curved surfaces or have a cut point on the boundary between the two machining curved surfaces.

As a method of calculating a new command point, for example, it is sufficient to generate points at fixed intervals on a tool path between the correction command points, calculate a vector at a point generated on the basis of two curved surface normal vectors, and, when the tool is disposed at the respective generated points and moved in the direction of the calculated vector or the opposite direction of the direction, determine whether the new command point simultaneously has cut points with respect to the two machining curved surfaces or has cut points on the boundary between the two machining curved surfaces.

At this time, when the tool path simultaneously includes cut points with respect to the two machining curved surfaces or a plurality of command points including cut points on the boundary between the two machining curved surfaces are obtained, it is possible to determine the tool path by a method of selecting a point where a movement amount from an interpolation path is the smallest among the plurality of command points.

Figure 34:
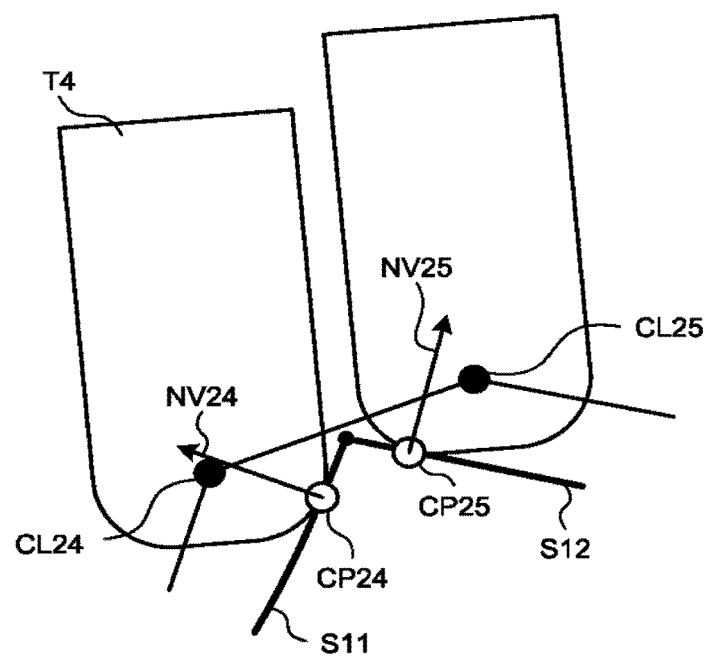
FIG. 34 is a third diagram for explaining the operation for correcting tool path data in the tool-path correcting apparatus according to the second embodiment.

FIG. 34 is a third diagram for explaining the operation for correcting tool path data in the tool-path correcting apparatus according to the second embodiment. In FIG. 34, a side surface of the Tool 4 at the time when a command point correcting direction is a curved surface normal vector direction with respect to the command point CL24 and the command point CL25, which are a combination of correction command points, is illustrated.

The cut point CP24 corresponding to the command point CL24 is obtained as a point where the machining curved surface S11 is in contact with a tool shape of the tool T4.

The cut point CP25 corresponding to the command point CL25 is obtained as a point where the machining curved surface S12 is in contact with the tool shape of the tool T4.

At this time, the tool-path-data correcting unit 113 calculates a normal vector NV24 at the cut point CP24 on the machining curved surface S11 and a normal vector NV25 at the cut point CP25 on the machining curved surface S12.

Figure 35:
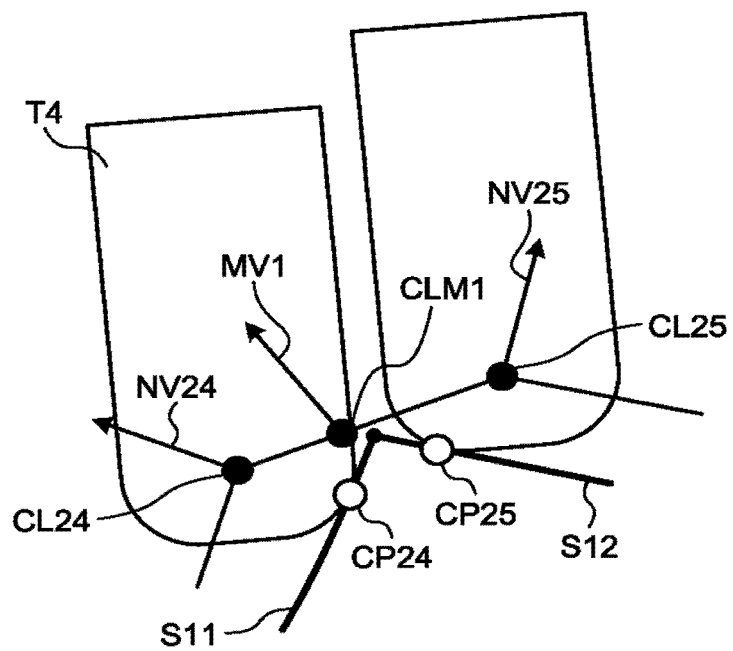
FIG. 35 is a fourth diagram for explaining the operation for correcting tool path data in the tool-path correcting apparatus according to the second embodiment.

FIG. 35 is a fourth diagram for explaining the operation for correcting tool path data in the tool-path correcting apparatus according to the second embodiment.

In FIG. 35, a state is illustrated in which a vector MV1 interpolating the calculated normal vectors NV24 and NV25 at a command point CLM1 at certain one point on an interpolation path between the command point CL24 and the command point CL25 is calculated.

As a method of calculating the vector MV1 at this time, for example, there is a method of linearly interpolating the normal vector NV24 and the normal vector NV25 according to a ratio of the distance between the command point CL24 and the command point CLM1 and the distance between the command point CL25 and the command point CLM1.

Figure 36:
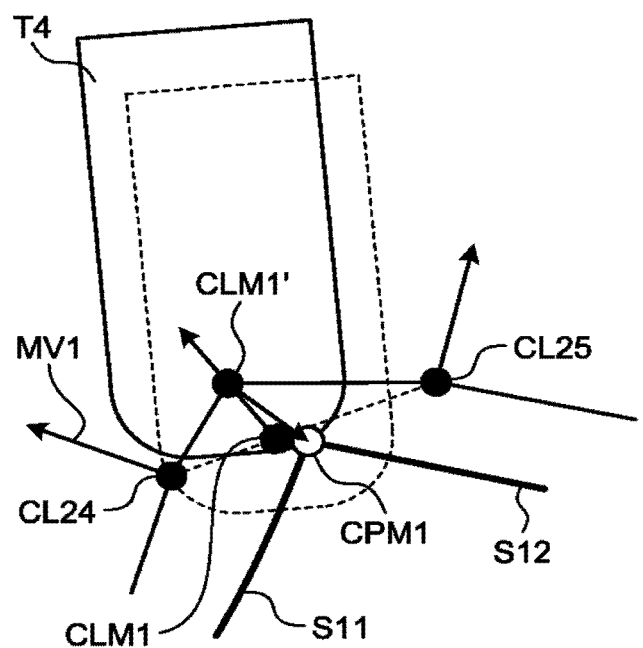
FIG. 36 is a fifth diagram for explaining the operation for correcting tool path data in the tool-path correcting apparatus according to the second embodiment.

FIG. 36 is a fifth diagram for explaining the operation for correcting tool path data in the tool-path correcting apparatus according to the second embodiment.

In FIG. 36, a state is illustrated in which, when the tool T4 is disposed with respect to the command point CLM1, the tool T4 is moved from the command point CLM1 in the direction of the calculated vector MV1 and a command point CLM1' including a cut point CPM1 on the boundary between the machining curved surface S11 and the machining curved surface S12 is calculated anew.

As a method of moving the tool T4 from the command point CLM1, there is a method of gradually moving the tool T4 from the command point CLM1 in the direction of the vector MV1 using the bisection method and repeating the movement until the tool T4 is disposed on the boundary between the machining curved surface S11 and the machining curved surface S12.

Therefore, the command point CLM1' inserted anew between the command point CL24 and the command point CL25 can be obtained with respect to the command point CL24 and the command point CL25, which are a set of correction command points.

Another command point correction example at step 205 in the second embodiment is explained with reference to FIG. 37 to FIG. 39.

Figure 37:
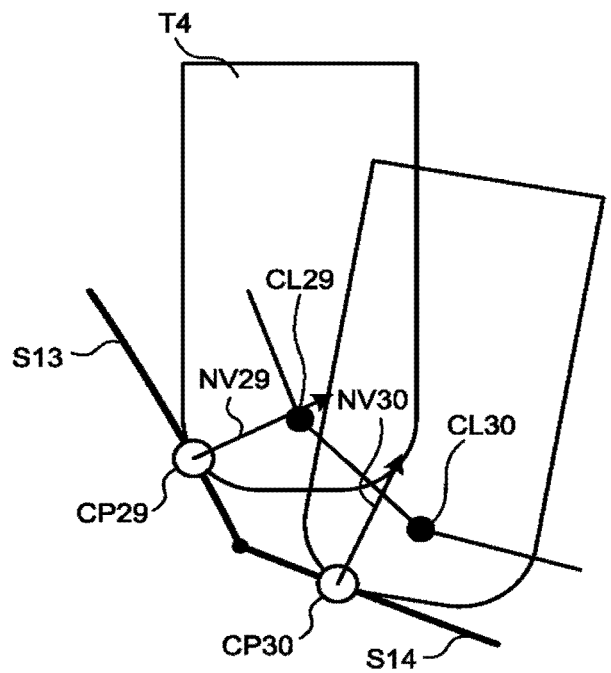
FIG. 37 is a sixth diagram for explaining the operation for correcting tool path data in the tool-path correcting apparatus according to the second embodiment.

FIG. 37 is a sixth diagram for explaining the operation for correcting tool path data in the tool-path correcting apparatus according to the second embodiment. In FIG. 37, a side surface at the time when a command point correcting direction is a curved surface normal vector direction with respect to the command point CL29 and the command point CL30, which are a set of correction command points, is illustrated.

The cut point CP29 corresponding to the command point CL29 is obtained as a point where the machining curved surface S13 is in contact with the tool shape of the tool T4.

The cut point CP30 corresponding to the command point CL30 is obtained as a point where the machining curved surface S14 is in contact with the tool shape of the tool T4.

At this time, the tool-path-data correcting unit 113 calculates a normal vector NV29 at the cut point CP29 on the machining curved surface S13 and a normal vector NV30 at the cut point CP30 on the machining curved surface S14.

Figure 38:
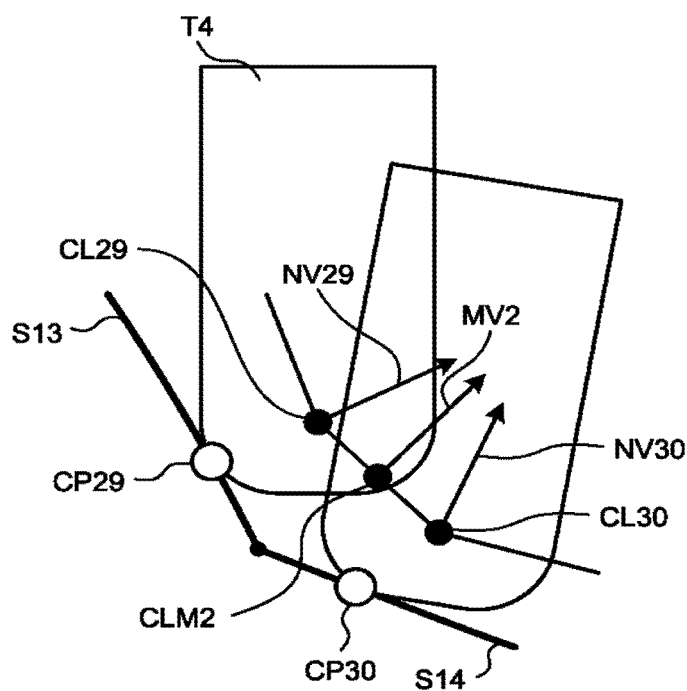
FIG. 38 is a seventh diagram for explaining the operation for correcting tool path data in the tool-path correcting apparatus according to the second embodiment.

FIG. 38 is a seventh diagram for explaining the operation for correcting tool path data in the tool-path correcting apparatus according to the second embodiment.

In FIG. 38, a state is illustrated in which a vector MV2 interpolating the calculated normal vectors NV29 and NV30 at a command point CLM2 at certain one point on an interpolation path between the command point CL29 and the command point CL30 is calculated.

As a method of calculating the vector MV2 at this time, for example, there is a method of linearly interpolating the normal vector NV29 and the normal vector NV30 according to a ratio of the distance between the command point CL29 and the command point CLM2 and the distance between the command point CL30 and the command point CLM2.

Figure 39:
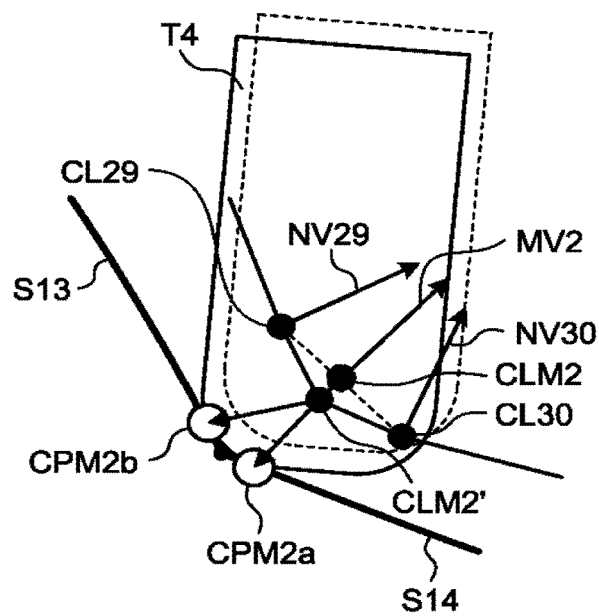
FIG. 39 is an eighth diagram for explaining the operation for correcting tool path data in the tool-path correcting apparatus according to the second embodiment.

FIG. 39 is an eighth diagram for explaining the operation for correcting tool path data in the tool-path correcting apparatus according to the second embodiment.

In FIG. 39, a state is illustrated in which, when the tool T4 is disposed with respect to the command point CLM2, the tool T4 is moved from the command point CLM2 in the opposite direction of the calculated vector MV2 and a command point CLM2' where cut points CPM2a and CPM2b are respectively simultaneously disposed on the machining curved surfaces S13 and S14 is calculated anew.

As a method of moving the tool T4 from the command point CLM2, there is a method of gradually moving the tool T4 from the command point CLM2 in the opposite direction of the vector MV2 using the bisection method and repeating the movement until the tool T4 has cut points simultaneously with respect to the machining curved surface S13 and the machining curved surface S14.

Therefore, the command point CLM2' inserted anew between the command point CL29 and the command point CL30 is generated with respect to the command point CL29 and the command point CL30, which are a set of correction command points.

The tool-path-data correcting unit 113 corrects the tool path data by inserting the command point generated anew by the method explained above between two command points in the combination of correction command points and stores the corrected tool path data in the corrected-tool-path-data storing unit 114.

According to step 205 explained above, by correcting the correction command points with the command point correcting directions determined on the basis of the tool path data, it is possible to correct the correction command points while maintaining machining patterns at command points around the correction command points.

After the execution of step 205, the processing is ended.

Another command point correction example at step 205 in the second embodiment is explained with reference to FIG. 40 to FIG. 42.

Figure 40:
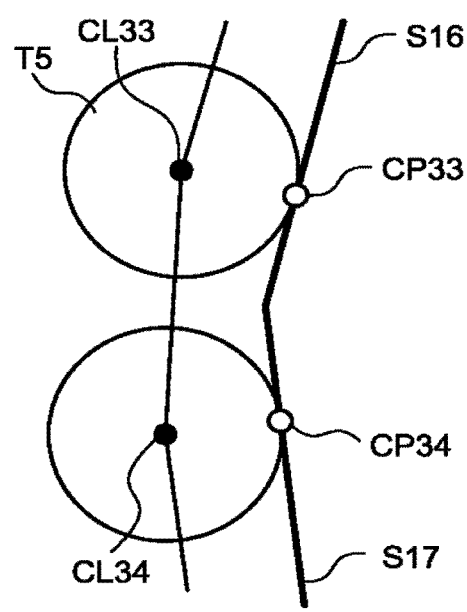
FIG. 40 is a ninth diagram for explaining the operation for correcting tool path data in the tool-path correcting apparatus according to the second embodiment.

FIG. 40 is a ninth diagram for explaining the operation for correcting tool path data in the tool-path correcting apparatus according to the second embodiment. In FIG. 40, the upper side of a machining curved surface at the time when command point correcting directions at a command point CL33 and a command point CL34, which are a combination of correction command points, are an in-plane direction is illustrated.

A cut point CP33 corresponding to the command point CL33 is obtained as a point where a machining curved surface S16 is in contact with a tool shape of a tool T5.

A cut point CP34 corresponding to a command point CL34 is obtained as a point where a machining curved surface S17 is in contact with the tool shape of the tool T5.

Figure 41:
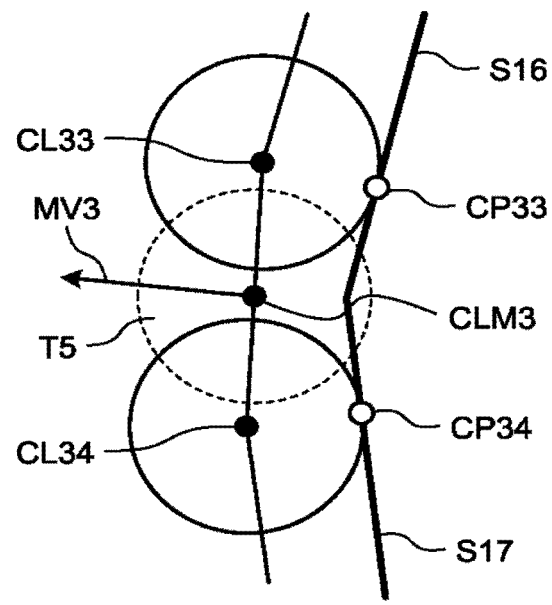
FIG. 41 is a tenth diagram for explaining the operation for correcting tool path data in the tool-path correcting apparatus according to the second embodiment.

FIG. 41 is a tenth diagram for explaining the operation for correcting tool path data in the tool-path correcting apparatus according to the second embodiment. In FIG. 41, a state of a vector MV3 that is certain one direction on a plane serving as a direction in which the tool T5 is moved at certain one command point CLM3 on an interpolation path between the command point CL33 and the command point CL34 is illustrated.

Figure 42:
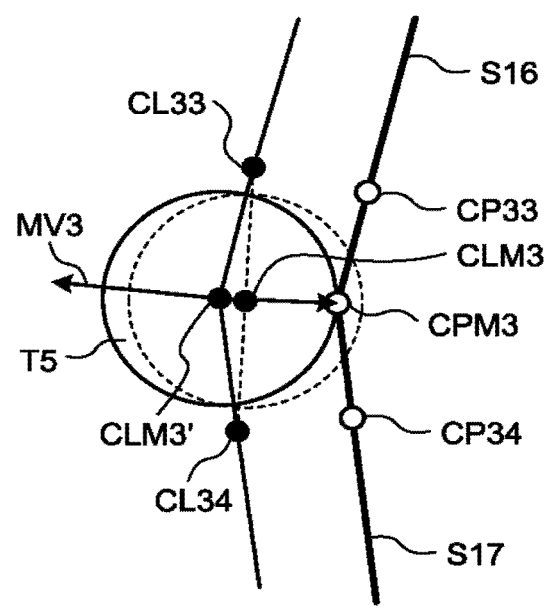
FIG. 42 is an eleventh diagram for explaining the operation for correcting tool path data in the tool-path correcting apparatus according to the second embodiment.

FIG. 42 is an eleventh diagram for explaining the operation for correcting tool path data in the tool-path correcting apparatus according to the second embodiment.

In FIG. 42, a state is illustrated in which, when the tool T5 is disposed with respect to the command point CLM3, the tool T5 is moved from the command point CLM3 in the direction of the vector MV3, and a command point CLM3' including a cut point CPM3 on the boundary between the machining curved surface S16 and the machining curved surface S17 is calculated.

As a method of moving the tool T5 from the command point CLM3, there is a method of gradually moving the tool T5 from the command point CLM3 in the direction of the vector MV3 using the bisection method and repeating the movement until the tool is in contact the boundary between the machining curved surface S16 and the machining curved surface S17.

When a vector, which is certain one direction on the plane, is used at certain one point on the interpolation path and the tool is not in contact with the boundary between the two machining curved surfaces, the tool-path-data correcting unit 113 changes the vector, which is certain one direction of the plane, and determines a new command point while repeating the same processing using a plurality of vectors.

When a plurality of new command points are calculated at certain one point on the interpolation path, it is possible to determine a new command point with a method of selecting, out of the plurality of command points, a command point having a smallest error of a distance with respect to the original interpolation path.

Further, when new command points are calculated at a plurality of points on the interpolation path, it is possible to finally determine a new command point with a method of selecting, out of the command points, a command point having a smallest error of a distance with respect to the original interpolation path.

Therefore, when the command point correcting direction is the in-plane direction with respect to a set of the command point CL33 and the command point CL34, which is a set of correction command points, it is possible to obtain a new command point CLM3' inserted between the command point CL33 and the command point CL34.

Still another command point correction example at step 205 in the second embodiment is explained with reference to FIG. 43 to FIG. 45.

Figure 43:
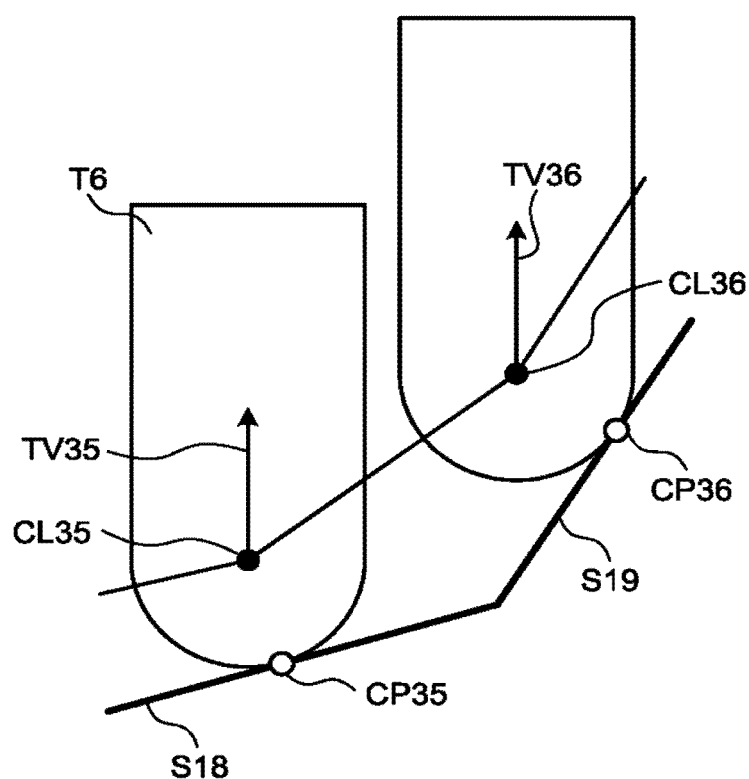
FIG. 43 is a twelfth diagram for explaining the operation for correcting tool path data in the tool-path correcting apparatus according to the second embodiment.

FIG. 43 is a twelfth diagram for explaining the operation for correcting tool path data in the tool-path correcting apparatus according to the second embodiment.

In FIG. 43, a side surface at the time when command point correcting directions at a command point CL35 and a command point CL36, which are a combination of correction command points, are a tool axis vector direction is illustrated.

A tool axis vector of a tool T6 at the command point CL35 is given as TV35. A tool axis vector of the tool T6 at the command point CL36 is given as TV36.

A cut point CP35 corresponding to the command point CL35 is obtained as a point where a machining curved surface S18 is in contact with a tool shape of the tool T6.

A cut point CP36 corresponding to the command point CL36 is obtained as a point where a machining curved surface S19 is in contact with the tool shape of the tool T6.

Figure 44:
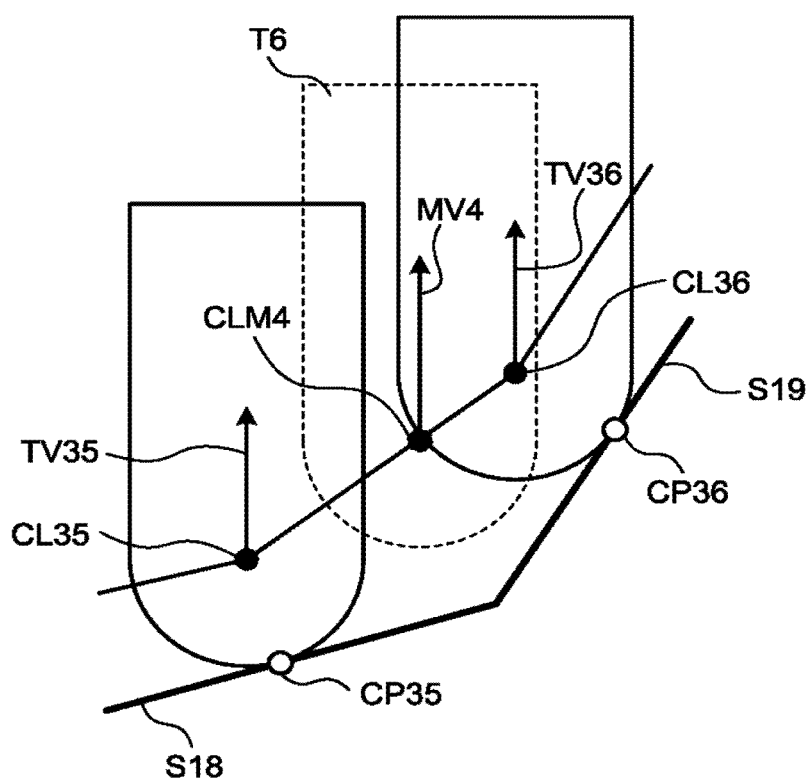
FIG. 44 is a thirteenth diagram for explaining the operation for correcting tool path data in the tool-path correcting apparatus according to the second embodiment.

FIG. 44 is a thirteenth diagram for explaining the operation for correcting tool path data in the tool-path correcting apparatus according to the second embodiment. In FIG. 44, a state of a direction vector MV4 serving as a direction in which the tool T6 is moved when the tool T6 is disposed at a command point CLM4 at certain one point on an interpolation path between the command point CL35 and the command point CL36 is illustrated.

At this time, the direction vector MV4 is calculated as a vector parallel to the tool axis vectors at the command point CL35 and the command point CL36.

Figure 45:
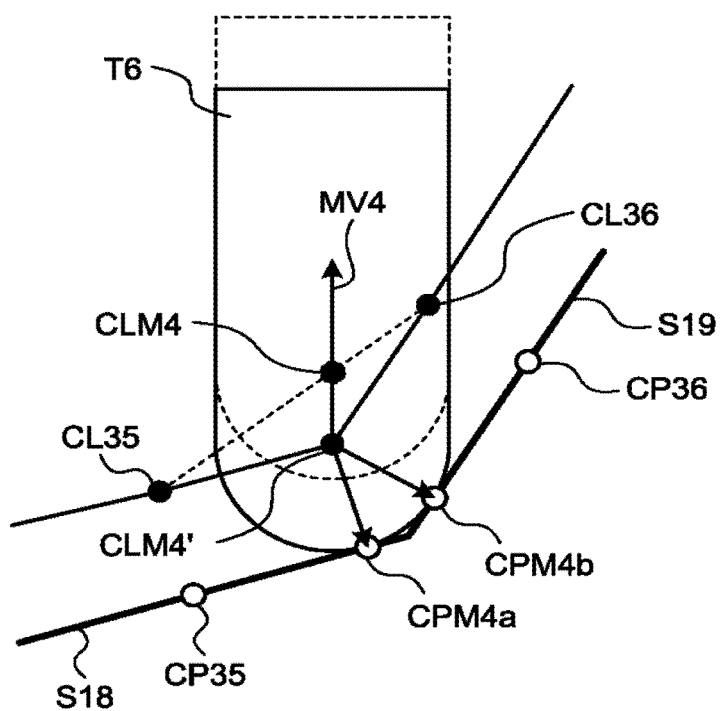
FIG. 45 is a fourteenth diagram for explaining the operation for correcting tool path data in the tool-path correcting apparatus according to the second embodiment.

FIG. 45 is a fourteenth diagram for explaining the operation for correcting tool path data in the tool-path correcting apparatus according to the second embodiment. In FIG. 45, a state is illustrated in which, when the tool T6 is disposed with respect to the command point CLM4, the tool T6 is moved from the command point CLM4 in the direction of the direction vector MV4 and a command point CLM4' including a cut point CPM4*a* and a cut point CPM4*b* simultaneously on the machining curved surface S18 and the machining curved surface S19 is calculated.

As a method of moving the tool T6 from the command point CLM4, there is a method of gradually moving the tool T6 from the command point CLM4 in the opposite direction of the direction vector MV4 using the bisection method and repeating the movement until the tool T4 simultaneously comes into contact with the machining curved surface S18 and the machining curved surface S19.

Therefore, the tool-path-data correcting unit 113 generates the command point CLM4' inserted anew between the command point CL35 and the command point CL36 with respect to the command point CL35 and the command point CL36, which are a set of correction command points.

The operation of the tool-path correcting apparatus 100 according to the second embodiment is as explained above.

With the tool-path correcting apparatus 100 according to the second embodiment, cut point information, which is information concerning cut points by a tool on a machining curved surface, is calculated. Information concerning a combination of correction command points, which is a combination of command points that should be corrected on the basis of curved surface discrimination information, is extracted. Therefore, it is possible to detect shaving and insufficient shaving on a machining shape between two continuous command points by the tool.

Note that, in the first and second embodiments, the configuration examples of the tool-path correcting apparatus 100 including the tool-path-data input unit 101, the tool-data input unit 103, the shape-data input unit 105, the tool-path-data storing unit 102, the tool-data storing unit 104, and the shape-data storing unit 106 are explained.

However, configuration examples of the tool-path correcting apparatus 100 are not limited to these configuration examples. In the tool-path correcting apparatus 100 according to the first and second embodiments, tool path data, tool data, and shape data input from the outside of the tool-path correcting apparatus 100 can be directly input to the cut-point calculating unit 107, the correction-command-point extracting unit 109, the command-point-correcting-direction determining unit 111, and the tool-path-data correcting unit 113.

As explained above, the tool-path correcting apparatus 100 according to the first and second embodiments includes a cut-point calculating unit that calculates, on the basis of tool path data in which movement of a tool for machining a machining target object or the machining target object is described, tool data of the tool, and shape data of a machining shape of the machining target object, cut point information, which is information concerning cut points by the tool on a machining curved surface of the machining shape at the time when the tool is disposed at command points described in the tool path data, a correction-command-point extracting unit that extracts, on the basis of the tool path data and the cut point information, correction command points, which are command points that should be corrected among the command points described in the tool path data, a command-point-correcting-direction determining unit that determines command point correcting directions, which are directions in which the respective correction command points extracted by the correction-command-point extracting unit should be corrected, and a tool-path-data correcting unit that corrects the tool path data by correcting, on the basis of the tool data, the shape data, the cut point information, the correction command points, and the command point correcting directions, the correction command points according to the command point correcting directions such that the tool comes into contact with the machining curved surface.

The cut point information, which is the information concerning the cut points by the tool on the machining curved surface, is calculated. Correction command point information, which is command points that should be corrected on the basis of the cut point information, is extracted. Therefore, it is possible to detect the tool actually cutting into work at command points even if the command points are present in a region on the outer side of the shape data.

With the tool-path correcting apparatus 100, when a radius end mill or a flat end mill, which is a rotary tool other than the ball end mill, is used or when the tool is a tool having an asymmetrical shape such as a turning tool, it is possible to determine whether the tool is in a shaving state.

With the tool-path correcting apparatus 100, the correction command points are extracted on the basis of the cut point information. Therefore, it is possible to detect insufficient shaving even when the command points are present in a region on the outer side of the machining shape.

The cut-point calculating unit calculates, as the cut point information, a relative positional relation between the tool and the machining curved surface at the time when the tool is disposed at the command points. The correction-command-point extracting unit extracts the command points as the correction command points on the basis of the relative positional relation between the tool and the machining curved surface of the cut point information when the tool is separated from the machining curved surface and when the machining curved surface intrudes into an inside of the tool.

By calculating the relative positional relation between the tool and the machining curved surface at the cut points, it is possible to discriminate shaving and insufficient shaving on the machining curved surface by the tool.

In addition, the cut-point calculating unit calculates, when the tool is in contact with the machining curved surface, as the cut point information, a coordinate of a point where the tool and the machining curved surface are in contact, calculates, when the tool is separated from the machining curved surface, as the cut point information, a coordinate of a nearest contact point of the tool and the machining curved surface on the machining curved surface, and calculates, when the machining curved surface intrudes into an inside of the tool, as the cut point information, a coordinate of a point where the tool and the machining curved surface are most distant on the machining curved surface. When a curve interpolating, along the machining curved surface, two cut points corresponding to continuous two command points at the two cut points crosses the boundary between the machining curved surfaces, the correction-command-point extracting unit extracts the two command points as a combination of correction command points.

Consequently, it is possible to extract shaving and insufficient shaving between the continuous two command points.

In addition, the cut-point calculating unit calculates, as the cut point information, curved surface discrimination information for discriminating on which machining curved surface of the machining shape the positions of the cut points are present. On the basis of the curved surface discrimination information, when at least one or more machining curved surfaces are not shared among respective machining curved surface groups in which the two cut points corresponding to the continuous two command points are present, the correction-command-point extracting unit determines that the curve interpolating the two cut points along the machining curved surface crosses the boundary between the machining curved surfaces.

Consequently, it is possible to discriminate which machining curved surface the tool machines at the command points. When correction of the tool path data is performed, it is possible to correct the tool path data such that the same machining curved surface is machined at command points before the correction and the after the correction.

The tool-path-data correcting unit corrects the tool path data such that the tool is in contact with the machining curved surface at the correction command points.

Consequently, when the tool path data after the correction is used, it is possible to perform machining without insufficient shaving or excessive shaving.

The tool-path correcting apparatus 100 further includes a command-point-correcting-direction determining unit that determines command point correcting directions, which are directions in which the correction command points extracted by the correction-command-point extracting unit should be corrected. The tool-path-data correcting unit corrects the tool path data according to the command point correcting directions.

Consequently, it is possible to correct the tool path data according to the command point correcting directions in which correction is desired to be performed at the respective correction command points.

The command-point-correcting-direction determining unit determines that the command point correcting directions of the correction command points are a curved surface normal vector direction of the machining curved surface at the cut points corresponding to the correction command points.

Consequently, the operator does not need to designate correcting directions with respect to the command points in advance according to machining patterns. Work efficiency is improved.

The command-point-correcting-direction determining unit distinguishes the command points into a plane section command point group, which is a set of continuous command points present in the same plane, and a connecting section command point group not included in the plane section command point group and determines whether tool axis vectors of the command points included in the plane section command point group are parallel to one another. When determining that the tool axis vectors are parallel to one another, the command-point-correcting-direction determining unit further determines a relation between the tool axis vectors and the plane. When determining that the tool axis vectors and the plane are parallel, the command-point-correcting-direction determining unit determines that the command point correcting directions of the correction command points included in the plane section command point group are a tool axis vector direction. When determining that the tool axis vectors and the plane are perpendicular, the command-point-correcting-direction determining unit determines that the command point correcting directions of the correction command points included in the plane section command point group are the in-plane direction. On the other hand, when determining that the tool axis vectors are not parallel to one another, the command-point-correcting-direction determining unit determines that the command point correcting directions of the correction command points included in the plane section command point group are a curved surface normal vector direction of the machining curved surface at the cut points corresponding to the correction command points. The command-point-correcting-direction determining unit determines that the command point correcting directions of the correction command points included in the connecting section command point group are a curved surface normal vector direction of the machining curved surface at the cut points corresponding to the correction command points.

Consequently, in a tool path including a plurality of machining patterns, correcting directions of the command points are determined for each of portions on the basis of the tool path data. Therefore, the operator does not need to designate the correcting directions with respect to the command points in advance according to the machining patterns. Work efficiency is improved.

By correcting the command points according to the command point correcting directions determined on the basis of the tool path data, it is possible to correct the command points while maintaining the machining patterns at the command points around the correction command points.

The tool-path-data correcting unit corrects the tool path data by inserting a new command point to simultaneously have cut points with respect to two machining curved surfaces on which first and second cut points corresponding to the combination of correction command points are present.

Consequently, because the tool path data after the correction passes the boundary between the machining curved surfaces, it is possible to perform machining without insufficient shaving and excessive shaving in the boundary between the machining curved surfaces.

The tool-path-data correcting unit corrects the tool path data by inserting a new command point to have cut points on the boundary between two machining curved surfaces on which first and second cut points corresponding to the combination of correction command points are present.

Consequently, the tool path data after the correction passes the boundary between the machining curved surfaces. Therefore, it is possible to perform machining without insufficient shaving and excessive shaving in the boundary between the machining curved surfaces.

The configurations explained above in the embodiments indicate examples of the content of the present invention. The configurations can be combined with other publicly-known technologies. A part of the configurations can be omitted or changed in a range not departing from the spirit of the present invention.

REFERENCE SIGNS LIST

100 tool-path correcting apparatus; 101 tool-path-data input unit; 102 tool-path-data storing unit; 103 tool-data input unit; 104 tool-data storing unit; 105 shape-data input unit; 106 shape-data storing unit; 107 cut-point calculating unit; 108 cut-point storing unit; 109 correction-command-point extracting unit; 110 correction-command-point storing unit; 111 command-point-correcting-direction determining unit; 112 command-point-correcting-direction storing unit; 113 tool-path-data correcting unit; 114 corrected-tool-path-data storing unit.

The invention claimed is:

1. A tool-path correcting apparatus comprising:
a cut-point calculating circuit to, on the basis of tool path data in which movement of a tool for machining a machining target object or the machining target object is described, tool data of the tool, and shape data of a machining shape of the machining target object, as cut point information, which is information concerning cut points by the tool on a machining curved surface of the machining shape at a time when the tool is disposed at command points described in the tool path data, calculate a coordinate of a contact point of the tool and the machining curve surface when the tool is in contact with the machining curved surface, calculate a coordinate of a nearest contact point of the tool and the machining curved surface on the machining curved surface when the tool is separated from the machining curved surface, or calculate a coordinate of a most distant point from the tool and the machining curved surface on the machining curved surface when the machining curved surface intrudes into an inside of the tool;
a correction-command-point extracting circuit to extract, on the basis of the tool path data and the cut point information, as correction command points, command points where the tool is separated from the machining curved surface or the curved surface intrudes into the inside of the tool, among the command points described in the tool path data;
a command-point-correcting-direction determining circuit to determine command point correcting directions, which are directions in which the correction command points should be corrected, on the basis of the correction command points; and
a tool-path-data correcting circuit to correct the tool path data by correcting, on the basis of the tool data, the shape data, the cut point information, the correction command points, and the command point correcting directions, the correction command points according to the command point correcting directions such that the tool comes into contact with the machining curved surface.

2. The tool-path correcting apparatus according to claim 1, wherein the command-point-correcting-direction determining circuit sets the command point correcting directions of the correction command points as a curved surface normal vector direction of the machining curved surface at the cut points corresponding to the correction command points.

3. The tool-path correcting apparatus according to claim 1, wherein the command-point-correcting-direction determining circuit distinguishes the command points into a plane section command point group, which is a set of the command points continuously present in a same plane, and a connecting section command point group not included in the plane section command point group and determines whether tool axis vectors of the command points included in the plane section command point group are parallel to one another, when determining that the tool axis vectors are parallel to one another, further determines a relation between the tool axis vectors and the plane, when determining that the tool axis vectors and the plane are parallel, determines that the command point correcting directions of the correction command points included in the plane section command point group are a tool axis vector direction, when determining that the tool axis vectors and the plane are perpendicular, determines that the command point correcting directions of the correction command points included in the plane section command point group are an in-plane direction, and, when determining that the tool axis vectors are not parallel to one another, determines that the command point correcting directions of the correction command points included in the plane section command point group are a curved surface normal vector direction of the machining curved surface at the cut points corresponding to the correction command points, and determines that the command point correcting directions of the correction command points included in the connecting section command point group are a curved surface normal vector direction of the machining curved surface at the cut points corresponding to the correction command points.

4. A tool-path correcting apparatus comprising:
- a cut-point calculating circuit to, on the basis of tool path data in which movement of a tool for machining a machining target object or the machining target object is described, tool data of the tool, and shape data of a machining shape of the machining target object, dispose the tool at a command point described in the tool path data and calculate cut point information, which is information concerning cut points by the tool on a machining curved surface of the machining shape by the shape data;
- a correction-command-point extracting circuit to extract, on the basis of the tool path data and the cut point information, two first and second command points of the command points as correction command points, which are command points that require correction when first and second cut points respectively corresponding to adjacent two first and second command points of the command points described in the tool path data are discontinuous along the machining curved surface; and
- a tool-path-data correcting circuit to correct the tool path data on the basis of the tool data, the shape data, the cut point information, and the correction command point to simultaneously have cut points with respect to two machining curved surfaces, which are two separate regions on an outer surface of the tool, on which the first and second cut points respectively corresponding to the two first and second command points are present or have a cut point on a boundary between the two machining curved surfaces on which the first and second cut points are present.

5. The tool-path correcting apparatus according to claim 4, wherein
- the cut-point calculating circuit calculates, as the cut point information, curved surface discrimination information for discriminating on which machining curved surface of the machining shape positions of the cut points are present, and
- the correction-command-point extracting circuit extracts, on the basis of the curved surface discrimination information, the two first and second command points as correction command points, which are command points that should be corrected, when at least one or more machining curved surfaces are not shared over the first and second cut points respectively corresponding to the adjacent two first and second command points.

6. A tool-path correcting method comprising:
- calculating, on the basis of tool path data in which movement of a tool for machining a machining target object or the machining target object is described, tool data of the tool, and shape data of a machining shape of the machining target object, as cut point information, which is information concerning cut points by the tool on a machining curved surface of the machining shape at a time when the tool is disposed at command points described in the tool path data, a coordinate of a contact point of the tool and the machining curve surface when the tool is in contact with the machining curved surface, calculating a coordinate of a nearest contact point of the tool and the machining curved surface on the machining curved surface when the tool is separated from the machining curved surface, or calculating a coordinate of a most distant point from the tool and the machining curved surface on the machining curved surface when the machining curved surface intrudes into an inside of the tool;
- extracting, on the basis of the tool path data and the cut point information, as correction command points, command points where the tool is separated from the machining curved surface or the curved surface intrudes into the inside of the tool, among the command points described in the tool path data;
- determining command point correcting directions, which are directions in which the correction command points should be corrected, on the basis of the correction command points; and
- correcting the tool path data by correcting, on the basis of the tool data, the shape data, the cut point information, the correction command points, and the command point correcting directions, the correction command points according to the command point correcting directions such that the tool comes into contact with the machining curved surface.

* * * * *